(12) United States Patent
Dain et al.

(10) Patent No.: US 11,113,148 B2
(45) Date of Patent: Sep. 7, 2021

(54) METHODS AND SYSTEMS FOR METADATA TAG INHERITANCE FOR DATA BACKUP

(71) Applicant: International Business Machines Corporation, Armonk, NY (US)

(72) Inventors: Joseph Dain, Vail, AZ (US); Scott Brewer, Tucson, AZ (US); Sara M. Coronado, Tucson, AZ (US); Theodore T. Harris, Jr., Tucson, AZ (US); Gregory Kishi, Oro Valley, AZ (US); Raul Saba, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/257,425

(22) Filed: Jan. 25, 2019

(65) Prior Publication Data

US 2020/0241962 A1 Jul. 30, 2020

(51) Int. Cl.
*G06F 11/14* (2006.01)
*G06F 16/174* (2019.01)
(Continued)

(52) U.S. Cl.
CPC ...... *G06F 11/1435* (2013.01); *G06F 11/1451* (2013.01); *G06F 11/1464* (2013.01);
(Continued)

(58) Field of Classification Search
None
See application file for complete search history.

(56) References Cited

U.S. PATENT DOCUMENTS 5,953,419 A 9/1999 Lohstroh et al.
7,269,729 B2 9/2007 He et al.
(Continued)

FOREIGN PATENT DOCUMENTS

EP 2223237 B1 8/2016

OTHER PUBLICATIONS

List of IBM Patents or Applications Treated as Related.
(Continued)

*Primary Examiner* — Michael Alsip
(74) *Attorney, Agent, or Firm* — Scully, Scott, Murphy & Presser, P.C.

(57) ABSTRACT

Systems and methods for metadata tag inheritance during backup are disclosed. The method includes maintaining a plurality of data storage systems in communication with an external metadata management system, operating the metadata management system to store metadata corresponding to data residing on the data storage systems as a plurality of entries that include one or more custom tags, detecting an execution of a backup data operation command on data residing in a data storage system that causes creation of a backup copy of a data set in that data storage system in a destination data storage system, and operating the metadata management system to create a new metadata entry corresponding to the execution of the backup data operation command in response to detecting the execution of the backup data operation command. The new metadata entry includes at least one custom tag created before the execution of the backup data operation command.

20 Claims, 7 Drawing Sheets

(51) Int. Cl.
  *G06F 16/28* (2019.01)
  *G06F 16/2457* (2019.01)
  *G06F 16/907* (2019.01)
  *G06F 16/14* (2019.01)
  *G06F 16/11* (2019.01)

(52) U.S. Cl.
  CPC ........ *G06F 11/1469* (2013.01); *G06F 16/113* (2019.01); *G06F 16/14* (2019.01); *G06F 16/1748* (2019.01); *G06F 16/24573* (2019.01); *G06F 16/285* (2019.01); *G06F 2201/84* (2013.01)

(56) References Cited

U.S. PATENT DOCUMENTS

| | | | |
|---|---|---|---|
| 7,610,285 | B1 | 10/2009 | Zoellner et al. |
| 7,752,314 | B2 | 7/2010 | Trevor et al. |
| 7,849,048 | B2 | 12/2010 | Langseth et al. |
| 8,195,630 | B2 | 6/2012 | Ellis et al. |
| 8,224,788 | B2 | 7/2012 | Schachter |
| 8,407,216 | B2 * | 3/2013 | Walker .................... G06F 16/48 707/731 |
| 8,489,650 | B2 | 7/2013 | Li et al. |
| 8,689,239 | B2 | 4/2014 | Taylor et al. |
| 8,769,055 | B2 | 7/2014 | Murphy et al. |
| 8,898,101 | B2 | 11/2014 | Bone et al. |
| 8,935,366 | B2 | 1/2015 | Mehr et al. |
| 9,002,906 | B1 | 4/2015 | Rice et al. |
| 9,130,844 | B1 | 9/2015 | Malik et al. |
| 9,507,807 | B1 | 11/2016 | Florissi et al. |
| 9,571,666 | B2 | 2/2017 | Sharma |
| 9,665,404 | B2 | 5/2017 | Hu et al. |
| 9,720,965 | B1 | 8/2017 | Miskie |
| 2007/0038822 | A1 * | 2/2007 | Correl ................ G06F 11/1466 711/162 |
| 2009/0083940 | A1 | 4/2009 | Albrecht et al. |
| 2009/0089340 | A1 | 4/2009 | Ohr et al. |
| 2010/0274750 | A1 | 10/2010 | Oltean et al. |
| 2011/0304774 | A1 | 12/2011 | Latta et al. |
| 2011/0307493 | A1 | 12/2011 | Noor |
| 2012/0304247 | A1 * | 11/2012 | Badger ............... G06F 21/6218 726/1 |
| 2013/0298050 | A1 | 11/2013 | Emanuel et al. |
| 2015/0112939 | A1 * | 4/2015 | Cantwell ............ G06F 11/1451 707/646 |
| 2015/0154509 | A1 | 6/2015 | Lightner et al. |
| 2015/0242263 | A1 * | 8/2015 | Klose .................... G06Q 10/06 714/47.3 |
| 2015/0334203 | A1 * | 11/2015 | Soundararajan ...... G06F 9/5066 709/213 |
| 2016/0019317 | A1 | 1/2016 | Pawar et al. |
| 2016/0063021 | A1 | 3/2016 | Morgan et al. |
| 2016/0063993 | A1 | 3/2016 | Dolan et al. |
| 2016/0110370 | A1 | 4/2016 | Wetherall et al. |
| 2016/0110374 | A1 | 4/2016 | Wetherall et al. |
| 2016/0170844 | A1 | 6/2016 | Long et al. |
| 2016/0196324 | A1 | 7/2016 | Haviv et al. |
| 2016/0267086 | A1 | 9/2016 | Liden |
| 2017/0005923 | A1 | 1/2017 | Babakian |
| 2017/0161520 | A1 | 6/2017 | Lockhart, III et al. |
| 2017/0169103 | A1 | 6/2017 | Juneja et al. |
| 2017/0177904 | A1 | 6/2017 | Bilodeau et al. |
| 2017/0179995 | A1 | 6/2017 | Oviedo |
| 2017/0235764 | A1 | 8/2017 | Sharpe et al. |
| 2017/0337393 | A1 | 11/2017 | Crowe et al. |
| 2018/0075166 | A1 | 3/2018 | Pawar et al. |
| 2018/0225177 | A1 * | 8/2018 | Bhagi ...................... G06F 16/21 |
| 2019/0325059 | A1 | 10/2019 | Fair et al. |
| 2020/0026799 | A1 | 1/2020 | Fukuda et al. |

OTHER PUBLICATIONS

Wang, Y. et al., "Gnothi: Separating Data and Metadata for Efficient and Available Storage Replication," USENIX ATC, 2012.
Siersdorfer, S. et al., "Automatic Video Tagging Using Content Redundancy," SIGIR '09 Proceedings of the 32nd International ACM SIGIR Conference on Research and Development in Information Retrieval, Jul. 19-23, 2009, pp. 395-402.
Dawei, Y. et al., "A Probabilistic Model for Personalized Tag Prediction," KDD '10 Proceedings of the 16th ACM SIGKDD International Conference on Knowledge Discovery and Data Mining, Jul. 25-28, 2010, pp. 959-968.
Lipczak, M. et al., "Learning in Efficient Tag Recommendation," RecSys '10 Proceedings of the Fourth ACM Conference on Recommender Systems, Sep. 26-30, 2010, pp. 167-174.
"Storage Tiering with Dell EMC ISILON SmartPools" Dell, Inc., Nov. 2017.
Next Generation Storage Tiering with EMC ISILON SmartPools, EMC Corporation, Apr. 2013.
Disclosed Anonymously: Minimizing the Costly Update of Persistent Meta-Data in Multi-Tier Environment by Using Metadata Filter, ip.com, Nov. 24, 2015.
Disclosed Anonymously: Method for Notification Events Classification Based on Tags, ip.com, May 13, 2011.
Custom Metadata Types Implementation Guide, Salesforce, Aug. 9, 2017.
IBM: "A Tag Library Based Approach for Auto-Refreshing Web Pages Based on External Events", ip.com, Feb. 6, 2007.
Ghane, A.H. et al. "A network steganographic approach to overlay cognitive radio systems utilizing systematic coding," Physical Communication, vol. 27, 2018.
Ogiela, L. et al., "Classification of cognitive systems dedicated to data sharing," Optics and Photonics for Information Processing XI, vol. 10395, International Society for Optics and Photonics, 2017.
Hacigümüs, H. et al. "Providing Database as a Service," Data Engineering, 2002.
Mattsson, U.T., "Databse Encryption—How to Balance Security with Performance," Protegrity Corp., 2005.
Exner, P. et al., "KOSHIK—A Large-scale Distributed Computing Framework for NLP," ICPRAM, 2014.
Niekler, A. et al., "Leipzig Corpus Miner—A Text Mining Infrastructure for Qualitative Data Analysis," arXiv preprint, 2017.
Doyle, A. et al., "The EMBERS Architecture for Streaming Predictive Analytics," 2014 IEEE International Conference on Big Data, 2014.
Osazee-Obazee, E.P., "Data Management in an Elastic Storage Environment," Helsinki Metropolia University of Applied Sciences, May 30, 2015.
Jensen, K.B., "High Throughput Tertiary Storage in HPC Environments," Proceedings of the Doctoral Symposium of the 17th International Middleware Conference. ACM, 2016.
Calhoun, S.P. et al., "Large scale research data archiving: Training for an inconvenient technology," Journal of Computational Science, 2016.
Reuther, A. et al., "LLSuperCloud: Sharing HPC Systems for Diverse Rapid Prototyping," High Performance Extreme Computing Conference (HPEC), IEEE, 2013.
Tan, J. et al., "DynMR: Dynamic MapReduce with ReduceTask Interleaving and MapTask Backfilling," Proceedings of the Ninth European Conference on Computer Systems. ACM, 2014.
Li, C.S. et al., "Software defined environments: An introduction," IBM Journal of Research and Development, vol. 58, No. 2/3, Mar./May 2014.
Disclosed Anonymously, Data aware optimized backups—Object & System level, Jun. 2, 2016.
Disclosed Anonymously, System and Method to implement smart database restore techniques for heterogeneous databases to enhance the repair algorithm using meta data, Feb. 18, 2016.
Akolkar, A. et al., Intelligent Virtual Machine Backups Using Events and Alarms of Virtual Infrastructure, Jun. 17, 2011.
Holzenkamp, C., Capture, Indexing & Auto-Categorization, AIIM International, 2002.
Office Action dated Apr. 16, 2020 received in U.S. Appl. No. 16/257,489 50 pages.
Lovelace, et al., "IBM Tivoli Storage Manager as a Data Protection Solution", IBM, 2014, p. 7 and pp. 36-50.

(56) References Cited

OTHER PUBLICATIONS

Office Action dated Apr. 3, 2020 received in U.S. Appl. No. 16/257,498, 36 pages.
Office Action dated Oct. 15, 2020 received in U.S. Appl. No. 16/257,476 26 pages.
Office Action dated Feb. 17, 2021 received in U.S. Appl. No. 16/257,476, copy not enclosed.
Office Action dated May 14, 2021 received in U.S. Appl. No. 16/257,457, copy not enclosed.

* cited by examiner

METHODS AND SYSTEMS FOR METADATA TAG INHERITANCE FOR DATA BACKUP

BACKGROUND

The disclosure herein relates generally to an improved data storage system. Specifically, the present disclosure relates to a system for creating, storing, and moving metadata tags in a storage system.

Users and organizations that deal with significant quantities of digital information often have difficulty managing files and data in an efficient and intuitive manner. An inability to easily store, organize, and locate documents and content, while causing difficulty and irritation at the level of the individual user, may translate into significant inefficiencies and lost opportunities at the organizational level. Lost documents, overlooked e-mails and records, and the duplication of work between users or departments may impact a business's productivity and agility. For the digital consumer, difficulty organizing and locating digital data may result in user frustration and the accidental re-purchasing of extant content.

Modern high-capacity hard drives and remote storage solutions allow for the retention of large numbers of documents and records nearly indefinitely; however, increases in storage capacity have often not been accompanied by a corresponding increase in the effectiveness of document management tools and technology. Most modern storage solutions utilize some combination of a traditional directory-based file system and search-based data management such as full-text search or basic keyword tagging. Although appropriate for some types of data, both types of systems may present significant challenges when dealing with large numbers of files or heterogeneous data sets. Directory-based solutions may be satisfactory for highly structured data or content; however, directory-trees often break down as an organizational method when a document or datum is relevant across one or more data categories or when a user desires to cross-reference or locate documents based on an alternate organizational schema. Simple text and keyword search-based systems generally discard the rigid structure of the directory-tree, but may present other challenges, such as requiring that the user remember specific terms or phrases associated with the document to be located. The lack of structure associated with many keyword or full-text based data management solutions may also pose difficulties when similar keyword terms occur over different classes of documents, such as a "flight" keyword being used both for trip records and engineering documents.

Some of the weaknesses with directory and keyword/text search-based systems may be mitigated by associating metadata with each piece of data. Metadata is broadly defined as "data about data" i.e. a label or description. Thus, a given item of metadata may be used to describe an individual datum, or a content item, a given item of metadata can be used to describe a collection of data which can include a plurality of content items. The fundamental role of metadata is used to facilitate or aid in the understanding, use and management of data. The metadata required for efficient data management is dependent on, and varies with, the type of data and the context of use of this data. Using as an example a library, the data is the content of the titles stocked, and the metadata about a title would typically include a description of the content, and any other information relevant for whatever purposes, for example the publication date, author, location in the library, etc. For photographic images, metadata typically labels the date the photograph was taken, whether day or evening, the camera settings, and information related to copyright control, such as the name of the photographer, and owner and date of copyright. Therefore, the metadata may have clearer semantics and include some category information to organize the data in the repository. Even more, the relationships among different metadata items may be involved to describe more complex semantics. Obviously, the query on metadata is more effective to retrieve appropriate results than the full-text search, especially for some specific areas difficult to apply the full-text search, such as multimedia.

However, with the rapid increase in the amount and complexity of metadata, effective searching of metadata also becomes difficult. To standardize metadata associated with stored data (e.g., file, object, etc.) and/or to allow for structured searches and easier access to data, create specific metadata tags may also be created. Tags in metadata are used to describe the type and format of data. Each metadata tag has a specific meaning and prescribes a format for that data. In certain storage systems, users may define such metadata tags. In addition, some industries have developed standard metadata tags to be used in their industry and have promoted these standard metadata tags with the International Organization for Standards (ISO). Thus, metadata tags can be used to describe data content, which relates to what the object or data element contains; the data context, which indicates the who, what, why, where, and how aspects associated with the creation of the object or data element; and data structure, which relates to the formal set of associations within or among individual information objects.

Although the addition of metadata tags may allow for easier access to data, existing solutions often require a user to manually enter relevant metadata tags into a number of fields at the time that the document or data is being stored. In many cases, this process is extremely time consuming and may require that the user sort through a large number of metadata tag fields, only a fraction of which may be relevant for a particular data. These categories of metadata tags are often fixed for a particular storage system and/or selected without a deep understanding of the needs of the user or organization. Still further, many metadata-based storage systems may encounter problems if users are not familiar with organizational or system naming conventions, as the entry of metadata tags in dissimilar ways may hamper efficient search. Taken as a whole, these problems often hinder the adoption of metadata tag-based storage systems, and can lead to a loss in system effectiveness and overall utility. A system capable of leveraging the power of a metadata tag-based system while preserving qualities such as customizability, consistency, and/or ease of use could provide significant benefits to organizations and individuals working in and interacting with data rich digital environments. In certain storage system environments, a plurality of storage servers may be coupled to each other, wherein one or more of the storage servers may include a plurality of storage clusters.

Furthermore, in existing data storage systems, metadata and metadata tags associated with data in a storage system are stored in the storage system itself in association with or separately from the content/data. For example, in SPECTRUM SCALE storage system, users can store custom tags in an INODE allocated to data (e.g., file). However, storing of metadata tags in the storage system itself is inefficient and takes up valuable memory space. This is because performing searches for the metadata using metadata tags in a large storage system is slow and may also have performance implications on the storage system functions as well.

Moreover, each storage system in a storage cluster must be searched separately if the metadata tags are stored on the storage system itself. In addition to exacerbating performance issues, this may also lead to problems in managing such a process of searching through each storage system separately because, as storage devices within the system as a whole may be made by different vendors, have differing storage formats, use differing network communication protocols, etc., their metadata tags and/or corresponding formats may also differ.

SUMMARY

The summary of the disclosure is given to aid understanding of a data storage system system, data storage system architectural structure, processor, and method of tagging metadata corresponding to data residing on a data storage system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

Systems and methods for metadata tag inheritance are disclosed. According to an embodiment of the present disclosure, the methods may include maintaining a plurality of data storage systems in communication with an external metadata management system, operating the metadata management system to store metadata corresponding to data residing on the plurality of data storage systems as a plurality of entries, detecting an execution of a backup data operation command on data residing in at least one data storage system of the plurality of data storage systems that causes creation of a backup copy of a data set in the at least one data storage system in a destination data storage system, and operating the metadata management system to create a new metadata entry corresponding to the execution of the backup data operation command in response to detecting the execution of the backup data operation command. Each of the plurality of entries may include one or more custom tags, and the new metadata entry may include at least one custom tag created before the execution of the backup data operation command.

In certain embodiments, operating the metadata management system to store metadata corresponding to data residing on the plurality of data storage systems as a plurality of entries may include receiving event metadata from one or more of the plurality of data storage system, adding a custom tag to the received event metadata to form tagged event metadata, and storing the tagged event metadata. Optionally, adding the tag to the received event metadata may include receiving at least one policy from a user (that includes a plurality of classification rules and at least one tag associated with each of the plurality of classification rules), analyzing the received event metadata to determine if the received event metadata satisfies one or more of the plurality of classification rules, and in response to determining that the received event metadata satisfies one or more of the plurality of classification rules, adding the at least one tag associated with each of the one or more of the plurality of classification rules with the received metadata. The at least one tag may provide information about content corresponding to metadata stored in the metadata management system. Optionally, receiving event metadata from one or more of the plurality of data storage systems may include receiving event metadata upon execution of a data operation.

In other embodiments, operating the metadata management system to store metadata corresponding to data residing on the plurality of data storage systems as a plurality of entries may include receiving metadata from one or more of the plurality of data storage systems, extracting one or more components of the received metadata, and using at least one annotator to identify facets for one or more of the entries in the stored metadata. Optionally, the method may also include classifying the metadata based on the identified facets, and adding tags to one or more of the entries in the stored metadata.

In some embodiments, operating the metadata management system to create the new metadata entry corresponding to the execution of the backup operation command may include identifying one or more source custom tags included in metadata corresponding to the data set, determining whether the data set in the at least one data storage system matches a destination data set in the destination data storage system after the execution of the backup data operation command, adding the one or more source custom tags to the new metadata entry in response to determining that the data set in the at least one data storage system matches a destination data set in the destination data storage system after the execution of the backup data operation command. Optionally, determining whether the data set in the at least one data storage system matches the destination data set in the destination data storage system after the execution of the data operation command may include determining whether a name of the data set in the at least one data storage system matches a name of the destination data set.

In some embodiments, the data operation may be BACKUP, and/or ARCHIVE.

In one or more embodiments, the methods may be performed by a processor executing instructions included on a non-transitory computer readable medium.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, sub assemblies, systems, circuitry, embodiments, or devices shown, and the arrangements, structures, subassemblies, assemblies, features, aspects, methods, processes, circuitry, embodiments, and devices shown may be used singularly or in combination with other arrangements, structures, assemblies, subassemblies, systems, features, aspects, circuitry, embodiments, methods and devices.

DETAILED DESCRIPTION

Figure 1:
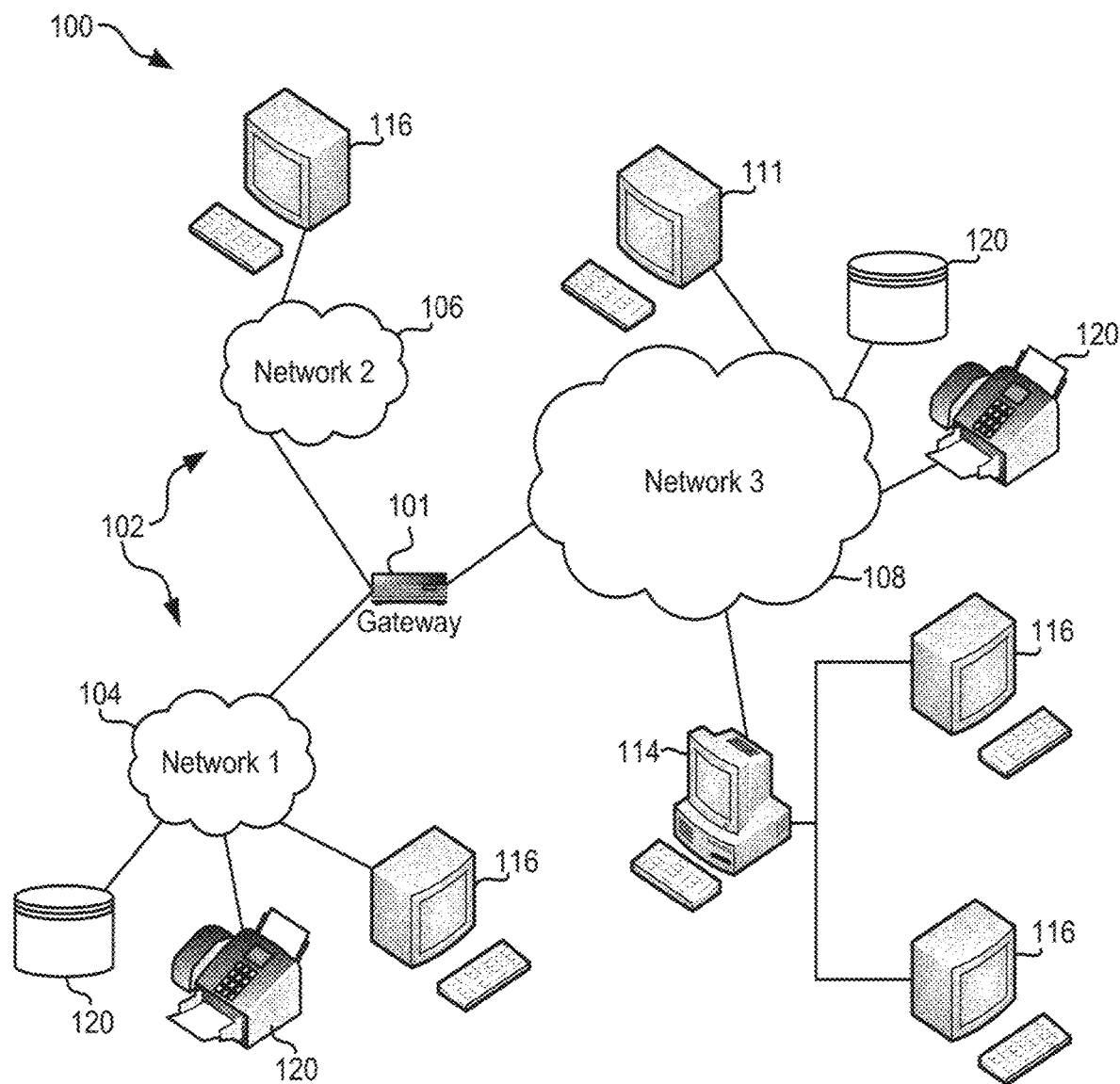
FIG. 1 depicts one example of a computing environment, according to embodiments of the present disclosure.

The following description is made for illustrating the general principles of the invention and is not meant to limit the inventive concepts claimed herein. In the following detailed description, numerous details are set forth in order to provide an understanding of the computer system, computer architectural structure, storage systems, processor, and their method of operation, however, it will be understood by those skilled in the art that different and numerous embodiments of the computer system, computer architectural structure, storage systems, processor, and their methods of operation may be practiced without those specific details, and the claims and disclosure should not be limited to the embodiments, subassemblies, assemblies, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "content" or "data" means any computer-readable data including, but not limited to, digital photographs, digitized analog photos, music files, video clips, text documents, interactive programs, web pages, word processing documents, computer assisted design files, blueprints, flowcharts, invoices, database reports, database records, video game assets, sound samples, transaction log files, electronic documents, files which simply name other objects, and the like. The content may be organized and stored in the form of objects, files, blocks, or any other suitable format in one or more data storage systems, and can include files, directories, file system volumes, data blocks, extents, or any other hierarchies or organizations of data blocks. As used herein, a "data set" can refer to (1) any file that is currently addressable by a file system or that was previously addressable by the file system (e.g., an archive file) and/or (2) a subset of such a file (e.g., a data block). Data may include structured data (e.g., database files), unstructured data (e.g., documents), and/or semi-structured data. Specifically, a data set can be a file, directory, share, volume, region within a volume, or an embedded object. Data sets can be complex, containing other embedded objects. For example, a file can be a container containing other files, or a volume can have a file system on top of it which in turn contains files. The system is capable of recognizing complex objects and tracking changes at finer embedded object granularity.

A "container" may be a data set which may have other embedded objects, such as a file, directory, file system, or volume.

As used herein, the term "metadata" refers to any descriptive or identifying information in computer-processable form that is associated with particular content or data set. Generally speaking, content will have metadata that is relevant to a number of characteristics of the content and the overall content collection (e.g., a file), including, but not limited to, the content's technical aspects (format, bytes used, date of creation), the workflow in which the content participates (creator, owner, publisher, date of publication, copyright information, etc) and the subject matter of the content (the nature of the sound of an audio file, be it music or a sound-effect, the subject of a photograph or video clip, the abstract of a lengthy text document, excerpted particulars of invoices or other data-interchange format files). For example, metadata items may include but are not limited to one or more of the following: the content owner (e.g., the client or user that generates the content), the last modified time (e.g., the time of the most recent modification of a data set), a data set name (e.g., a file name), a data set size (e.g., a number of bytes of data set), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data block), location/network (e.g., a current, past or future location of the data set and network pathways to/from the data block), geographic location (e.g., GPS coordinates), frequency of change (e.g., a period in which the data set is modified), business unit (e.g., a group or department that generates, manages or is otherwise associated with the set), aging information (e.g., a schedule, such as a time period, in which the data set is migrated to secondary or long term storage), boot sectors, partition layouts, file location within a file folder directory structure, user permissions, owners, groups, access control lists [ACLS]), system metadata (e.g., registry information), combinations of the same or the other similar information related to the data set.

The term "metadata tag" or "tag" refers to any descriptive or identifying information in computer-processable form that is associated with particular metadata, and that is indicative of the actual information of the content included in various data storage systems and with which the metadata is associated.

The following discussion omits or only briefly describes conventional features of data storage systems and information processing systems, including processors and microprocessor systems and architectures, which are apparent to those skilled in the art. It is assumed that those skilled in the art are familiar with the general architecture of data storage system, and in particular operations of data storage systems for data storage and/or operations on stored data. It may be noted that a numbered element is numbered according to the figure in which the element is introduced, and is typically referred to by that number throughout succeeding figures.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, smartphone, or any other type of logic device. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
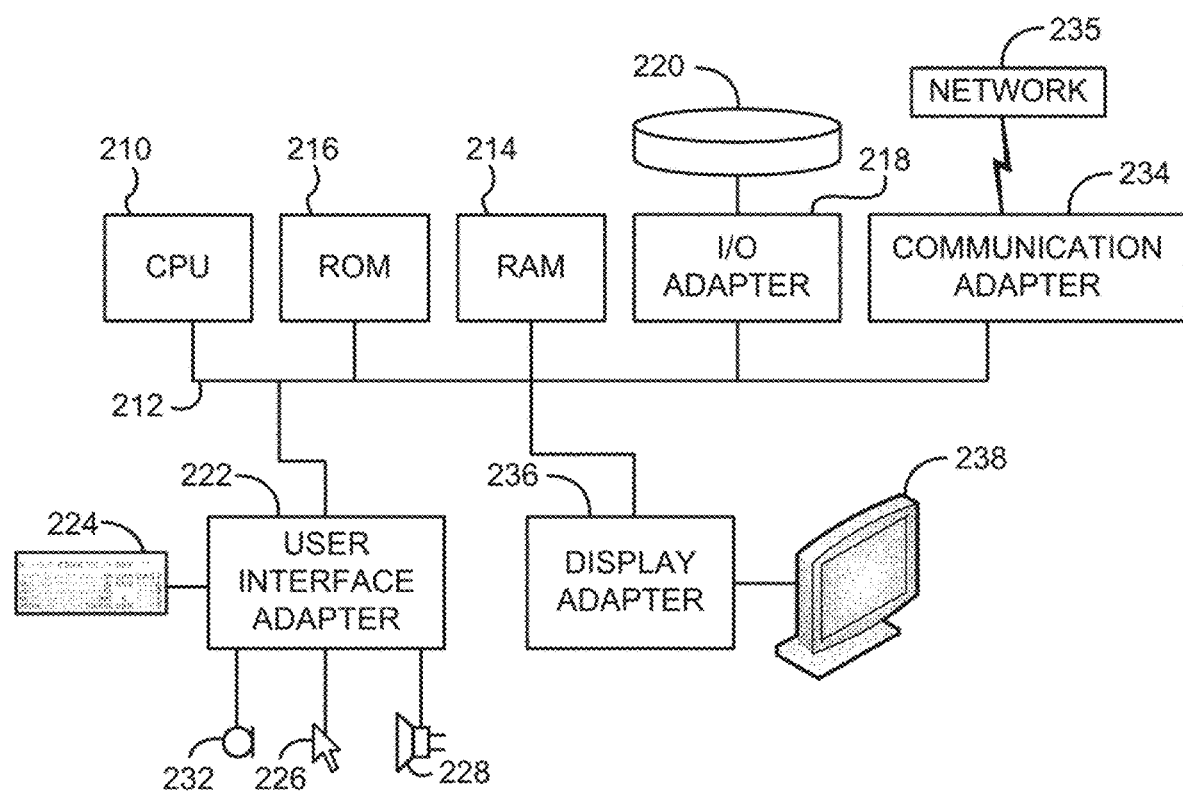
FIG. 2 is a functional block diagram illustrating a computer system, according to embodiments of the present disclosure.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as Microsoft Windows® Operating System (OS), MAC OS, UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
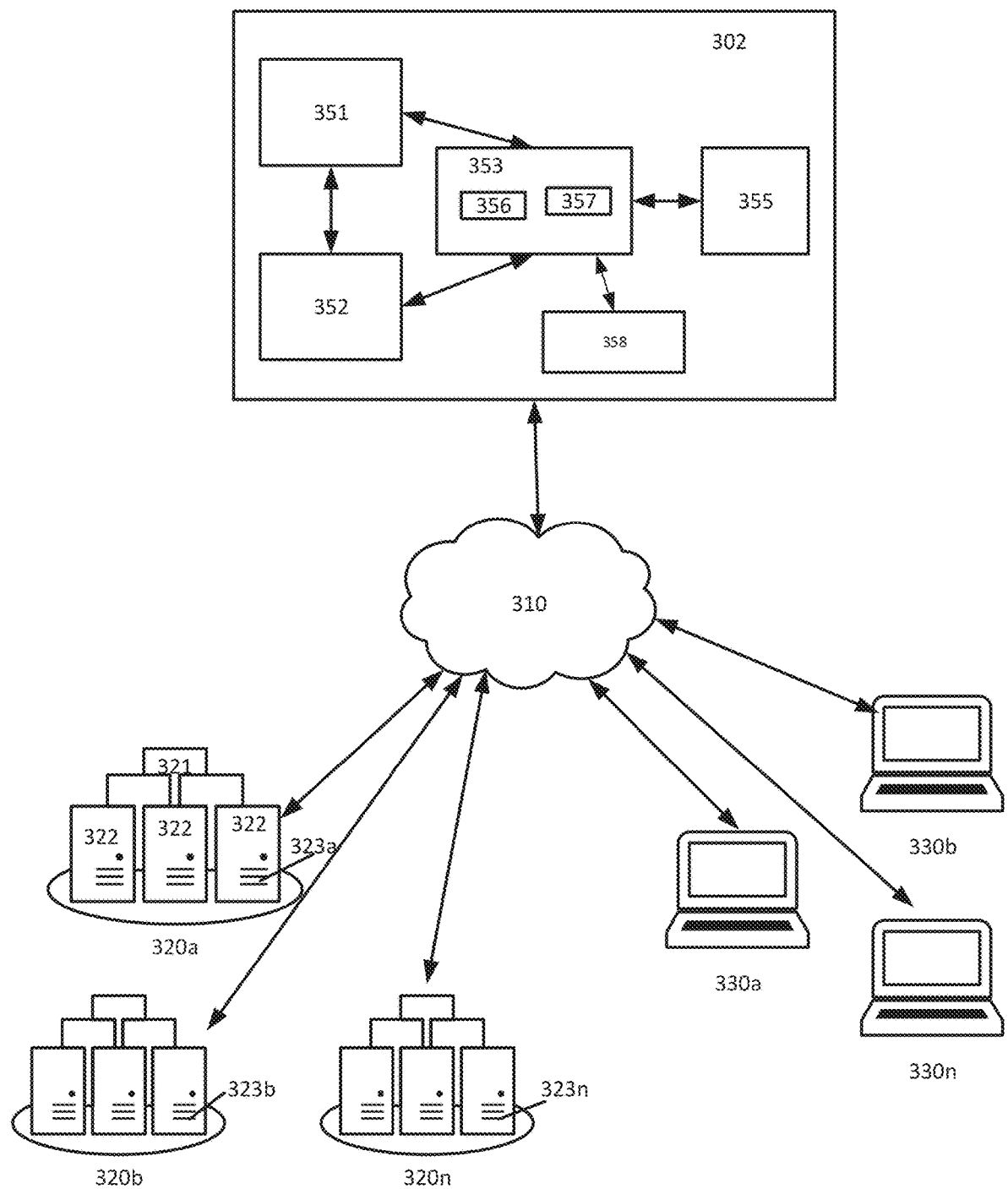
FIG. 3 depicts an example block diagram of an information management system, according to embodiments of the present disclosure.

Referring now to FIG. 3, there is illustrated an example block diagram of an information management system 300 that includes a set of networked data storage systems 320a, 320b . . . 320n, client devices 330a, 330b . . . 330n, and a metadata management system 302 in communication via a data network 310 and in accordance with implementations of this disclosure. It can be appreciated that the implementations disclosed herein are not limited by the number of storage devices or data storage systems attached to data network 310. It can be further appreciated that storage devices or data storage systems attached to data network 310 are not limited by communication protocols, storage environment, physical location, etc.

In one embodiment, each data storage system 320a, 320b . . . 320n may include a storage subsystem 321 and storage devices 322. The storage subsystem 321 may comprise a storage server or an enterprise storage server, such as the IBMS Enterprise Storage Server®. (IBM and Enterprise Storage Server are registered trademarks of IBM). The storage devices 322 may comprise storage systems known in the art, such as a Direct Access Storage Device (DASD), Just a Bunch of Disks (JBOD), a Redundant Array of Independent Disks (RAID), a virtualization device, tape storage, optical disk storage, or any other storage system known in the art. The storage devices 322 may comprise content organized as object storage, file storage, and/or block storage. In certain embodiments, multiple storage subsystems may be implemented in one storage subsystem 321 and storage devices 322, or one storage subsystem may be implemented with one or more storage subsystems having attached storage devices.

In certain embodiments, client devices 330a, 330b . . . 330n may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system. The client devices 330a, 330b . . . 330n can have at least one operating system (e.g., Microsoft Windows, Mac OS X, iOS, IBM z/OS, Linux, other Unix-based operating systems, etc.) installed thereon, which may support or host one or more file systems and other applications.

The data storage systems 320a, 320b . . . 320n and client devices 330a, 330b . . . 330n communicate according to well-known protocols, such as the Network File System (NFS) or the Common Internet File System (CIFS) protocols, to make content stored on data storage systems 320a, 320b . . . 320n appear to users and/or application programs as though the content were stored locally on the client systems 330a, 330b . . . 330n. In a typical mode of operation, the client devices 330a, 330b . . . 330n transmit one or more input/output commands, such as an NFS or CIFS request, over the computer network 310 to the data storage systems 320a, 320b . . . 320n, which in turn issues an NFS or CIFS response containing the requested content over the network 310 to the respective client devices 330a, 330b . . . 330n.

The client devices 330a, 330b . . . 330n may execute (internally and/or externally) one or more applications, which generate and manipulate the content on the one or more data storage systems 320a, 320b . . . 320n. The applications generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on. The applications may also have the ability to access (e.g., read and write to) data storage systems 320a, 320b . . . 320n using a network file system protocol such as NFS or CIFS.

As shown, the data storage systems 320a, 320b . . . 320n, the client devices 330a, 330b . . . 330n, the metadata management system 302, and other components in the information management system 300 can be connected to one another via a communication network 310. The communication network 310 can include one or more networks or other connection types including any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication network 310 in some cases may also include application programming interfaces (APIs) including, e.g., cloud service provider APIs, virtual machine management APIs, and hosted service provider APIs.

In an embodiment, the metadata management system 302 is configured to collect metadata corresponding to contents of the storage systems 320a, 320b . . . 320n, and generate and store information relating to characteristics of the stored data and/or metadata. The metadata management system 302 can be present to, for example, store, organize, protect, manage, manipulate, move, analyze, and/or process metadata of data storage systems 320a, 320b . . . 320n. Specifically, the metadata management system 302 may also be configured to generate and store other types of information that generally provides insights into the contents of the storage systems 320a, 320b . . . 320n. The metadata management system 302 can provide a number of benefits including improved storage operations, faster data operation performances, enhanced scalability, or the like. As one specific example which will be discussed below in further detail, the metadata management system 302 can act as a cache for storing metadata, for analyzing metadata, adding metadata tags, updating metadata tags, or the like.

In certain embodiments, the metadata management system 302 includes a metadata collection system 351 in communication with a metadata store 352 and a classifier 353.

Generally speaking, the metadata management system 302 may be implemented as a storage system (some combination of hardware and software) that manages, coordinates, and facilitates the transmission of metadata between a client computing device and one or more data storage systems, and/or between the one or more storage systems such that operations related to the metadata management system 302 do not significantly impact performance of other components in the information management system 300. Moreover, as will be described further, the metadata management system 302 may be configured to make calls to data storage system 320a, 320b . . . 320n and/or receive information from the data storage system 320a, 320b . . . 320n through data network 310. For example, metadata management system 302 may provide API calls, commands, or other services allowing for the storage, management, and retrieval of metadata, system data blocks, or items. In one embodiment, metadata management system 302 may include or be associated with one or more storage devices, providers, or solutions for the storage of items, system data blocks, or other data.

In an embodiment, the metadata collection system 351 may collect the metadata from data storage systems 320a, 320b . . . 320n and store it in the metadata store 352. The metadata collected by the metadata collection system 351 may be system metadata, event metadata, scan metadata, or any other type of metadata. System metadata includes metadata collected and stored by the data storage systems 320a, 320b . . . 320n internally using any now or hereafter known methods. Event metadata includes metadata corresponding to an event (or data operation) executed on the data storage systems 320a, 320b . . . 320n and may include, without limitation, information about the data set relating to the event (e.g., file name, location, author, size, or the like); information about the event (e.g., event type, function performed, resulting changes to the data, time of event, or the like); information about the application or client device that performed and/or initiated the event; information about the data storage system on which the event was executed, and/or the like. Scan metadata includes metadata collected by the metadata collection system 351 by externally scanning the contents (e.g., documents, files, objects, images, etc.) of the data storage systems 320a, 320b . . . 320n. System metadata and scan metadata may include, without limitation content metadata that provides information on data objects stored in data storage systems 320a, 320b . . . 320n; volume metadata that provides information on volumes configured in the data storage systems 320a, 320b . . . 320n in which the content is stored; device class metadata that defines the type of storage hardware used for a particular storage pool (the device class may indicate the storage device type and specifies a device type and media management information, such as recording format, estimated capacity, and labeling prefixes); library metadata that provides a further level of abstraction representing a storage entity that contains a media changer in addition to drives and tapes for storing data; and/or the like.

In certain embodiments, each of the data storage systems 320a, 320b . . . 320n may collect and store the system metadata corresponding to contents of the respective data storage systems internally using any now or hereafter known methods. For example, the data storage systems 320a, 320b . . . 320n may collect metadata when the contents are created, modified, and/or periodically using any now or hereafter known methods. The data storage systems 320a, 320b . . . 320n may transmit the collected system metadata to the metadata collection system 351 (via, for example, an API). The internally collected system metadata may be temporarily and/or permanently stored on the data storage systems 320a, 320b . . . 320n. For example, FIG. 3 illustrates system metadata 321a, 321b . . . 321n stored in data storage systems 320a, 320b . . . 320n, respectively.

Alternatively and/or additionally, the metadata collection system 351 may collect the metadata by performing a periodic scan of one or more of the data storage systems 320a, 320b . . . 320n ("scan metadata"). The metadata collection system may utilize any now or hereafter known techniques to collect the metadata from the data storage systems 320a, 320b . . . 320n (described below). For example, one approach to gathering stored data metadata is by scanning a data storage system from outside using standard client access network protocols such as NFS and CIFS protocols in a NAS file storage context and SCSI in a block storage context. Although not limited to a specific format, the aforementioned metadata can be of a data format referred to as inode. Alternatively, they may be in a data format referred to as NTFS in Windows® OSs. Metadata used in MacOS® may also be used. In certain embodiments, the metadata collection system 330 may use deep learning, machine learning, and/or other methods to parse the contents of the data storage systems 320a, 320b . . . 320n and collect the metadata (e.g., using the IBM Watson™ QA system available from International Business Machines Corporation, or other natural language processing and/or deep learning systems).

Alternatively and/or additionally, the metadata collection system 351 may collect event metadata. In certain embodiments, the data storage systems 320a, 320b . . . 320n may forward event metadata to the metadata collection system 351 upon occurrence of one or more events (e.g., a copy operation, backup operation, an encryption operation, or the like). For example, the metadata collection system 351 may install an event monitoring agent on the data storage systems 320a, 320b . . . 320n. In one or more embodiments, the metadata collection system 351 may configure the data storage systems 320a, 320b . . . 320n to send an event notification along with event metadata every time an event occurs for data residing on a data storage system. Alternatively, the metadata collection system 351 may configure the data storage systems 320a, 320b . . . 320n to send a collection of event notification and/or event metadata periodically.

The metadata collection system 351 may receive streams of log data (e.g., data storage system logs, client device logs) from many sources, convert log entries from the log data into events, and store the events in metadata store 352 based on fields specified in source type definitions (also referred to herein simply as source types). Each event represents a particular log entry. The events that are stored in the metadata store 352 may be based on log entries from various sources and may have different formats. Examples of log entries include simple network management protocol (SNMP) logs, reports from devices and/or applications running on devices, application programming interface (API) call records, information exchange protocols, remote authentication dial-in user service (RADIUS) logs, lightweight directory access protocol (LDAP) logs, security assertion markup language (SAML) messages, and so forth. These diverse events may all be stored and indexed in the metadata store 352, which may be a non-homogenous database, in a manner that enables the events to be searched and linked together.

For example, an event monitor agent may include a filter driver program and may be deployed on an input/output port of the data storage system, a read/write port, or data stack and operate in conjunction with a file management program to record events executed on a data storage system. Such operation may involve creating a data structure such as a record or journal of each event. The records may be stored in a journal data structure and may chronicle events in any form or structure (e.g., on an interaction by interaction basis). The journal data structure may include information regarding the type of event that has executed along with certain configurable relevant properties of the data involved in the event. One example of such a monitor program may include Microsoft's Change Journal. Each data storage system may then transmit the event log periodically and/or every time an event occurs to the data storage system. Alternatively and/or additionally, the metadata collection system 351 may periodically consult the recorded interactions for new entries. If new entries exist, the metadata collection system 351 may examine the entries, and if deemed relevant, the entries may be analyzed, parsed, and written to the metadata store 352 as an update.

In some other embodiments, the metadata collection system 351 may also monitor data interactions between the data storage systems 320a, 320b . . . 320n and/or between the client devices 330a, 330b . . . 330n and the data storage systems 320a, 320b . . . 320n, using any suitable monitoring methods, to collect event metadata. For example, the metadata collection system 351 may monitor data interactions by monitoring file system managers associated with each of the data storage systems 320a, 320b . . . 320n (e.g., operating system programs, a FAT, an NTFS, or the like that may be used to manage data movement to and/or from a mass storage device). In another example, the metadata collection system 351 may monitor data interactions by monitoring the network traffic on the communication network 310 using any now or hereafter known methods. In yet another example, the metadata collection system 351 may collect event metadata by interfacing and/or communicating with a virtual file system (VFS) layer that transfers data operation requests between the client devices 330a, 330b . . . 330n and the data storage systems 320a, 320b . . . 320n.

In certain embodiments, the metadata collection system 351 may collect system metadata, scan metadata, and/or event metadata in a manner that duplication of the collected metadata may be minimized. For example, the metadata collection system 351 may analyze the system metadata and may only collect scan metadata for metadata that is not included in the scan metadata and/or to update the system metadata periodically. Similarly, upon initialization the metadata collection system 351 may first collect system metadata and/or scan metadata from the data storage systems 320a, 320b . . . 320n (using one or more methods described above) before starting collection of event metadata. This may be done in order to obtain an accurate picture of the data being scanned and/or to maintain referential integrity within the system. Duplication may also be prevented by saving only the latest metadata corresponding to a data set. For example, if an event corresponding to a previously scanned data set is registered, the metadata collection system may overwrite the previously stored scan metadata for that data set with the new event metadata (or vice versa).

Events according to certain embodiments are generally data operations executed on the one or more data storage systems such as, without limitation, data migration operations (e.g., copy, backup, archive, email etc.), writing new data on the data storage system, reading data from the data storage system, deletion of data, changing one or more properties of data and/or associated metadata (e.g., rename, access permissions, security, encryption, or the like), printing, or other types of data operations. Such data operations lead to a modification in existing metadata of the corresponding data set and/or creation of new metadata (e.g., when new data set is created). Event metadata, therefore, may also include information relating to changes in the metadata corresponding to a data set.

For example, operations may be available to interact with stored data, including open, write new file (e.g., PUT), write (append to data set), write (modify and existing data set), close, read (e.g., GET), SAVE, RENAME, DELETE, or the like. A PUT operation writes a new object to a storage device of a data storage system or creates an updated version of an existing object on a storage device, and in the latter instance, the previous version may or may not be removed from the storage device. Typically, however, when an updated version of an existing object is written to the memory device, the newer version is identified in metadata as an update (e.g., "version 2)", while older versions (e.g., "version 1") remain stored on the storage device. A DELETE operation is typically associated with writing a new version of an object to a storage device (e.g., via a PUT operation) and indicating a deletion of the old version. Where the old version of the object is physically removed from a storage device, the removal may be hard (e.g., the old version of the object is immediately rewritten as zero-byte version) or soft (e.g., the old version of the object is marked deleted in metadata and later rewritten). In one example of removal, the old version of the object may be cleaned up by an out-of-band process. A GET operation retrieves a representation of an object already stored on a storage device, for instance, in order to read the object.

As discussed above, events may also include data migration operations that involve the copying or migration of data between different locations in the information management system 300 in an original/native and/or one or more different formats. For example, events can include operations in which stored data is copied, migrated, or otherwise transferred from one or more first storage systems to one or more second storage systems, from one or more first storage systems to one or more client devices, and/or within a storage system. Such operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies of metadata in the data storage systems itself. Nonetheless, some or all of these operations are referred to as "copy" operations for simplicity.

Backup Operations: A backup operation creates a copy of a version of data (e.g., one or more files or other data units) in a data storage system at a particular point in time. Each subsequent backup copy may be maintained independently of the first. Further, a backup copy in some embodiments is generally stored in a form that is different than the native format, e.g., a backup format. This can be in contrast to the version in the corresponding data storage system from which the backup copy is derived, and which may instead be stored in a native format of the source application(s). In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to corresponding data ("primary data"), and may be stored on media with slower retrieval times than primary data and certain other types of secondary copies. On the other hand, backups may have relatively shorter retention periods than some other types of secondary copies such as archive copies (described below). Backups may sometimes be stored at on offsite location. Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the volume-level, file-level, or block-level. Volume level backup operations generally involve the copying of a data volume (e.g., a logical disk or partition) as a whole. In a file-level backup, the information management system 300 may generally track changes to individual files at the file-level, and includes copies of files in the backup copy. In the case of a block-level backup, files are broken into constituent blocks, and changes are tracked at the block-level. Upon restore, the information management system 300 reassembles the blocks into files in a transparent fashion.

Far less data may actually be transferred and copied to secondary storage devices during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups Similar to backup operations, the other types of secondary copy operations described herein can also be implemented at either the volume-level, file-level, or block-level.

Archive Operations: Because backup operations generally involve maintaining a version of the copied data in primary data and also maintaining backup copies in secondary storage device(s), they can consume significant storage capacity. To help reduce storage consumption, an archive operation according to certain embodiments creates a secondary copy by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data or a secondary copy, depending on the situation. As with backup copies, archive copies can be stored in a format in which the data is compressed, encrypted, deduplicated, and/or otherwise modified from the original application format. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data is archived, in some cases the archived primary data or a portion thereof is deleted when creating the archive copy. Thus, archiving can serve the purpose of freeing up space in the primary storage device(s) Similarly, when a secondary copy is archived, the secondary copy may be deleted, and an archive copy can therefore serve the purpose of freeing up space in secondary storage device(s). In contrast, source copies often remain intact when creating backup copies.

Snapshot Operations: Snapshot operations can provide a relatively lightweight, efficient mechanism for protecting data. From an end-user viewpoint, a snapshot may be thought of as an "instant" image of the primary data at a given point in time, and may include state and/or status information relative to an application that creates/manages the data. In one embodiment, a snapshot may generally capture the directory structure of an object in primary data such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device or a secondary storage device) performs the snapshot operation in a self-contained fashion, substantially independently, using hardware, firmware and/or software residing on the storage device itself. For instance, the storage device may be capable of performing snapshot operations upon request, generally without intervention or oversight from any of the other components in the information management system 300. In this manner, hardware snapshots can off-load other components of information management system 300 from processing involved in snapshot creation and management.

A "software snapshot" (or "software-based snapshot") operation, on the other hand, can be a snapshot operation in which one or more other components in information management system 300 implement a software layer that manages the snapshot operation via interaction with the target storage device. For instance, the component implementing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or an application. In some other cases, the snapshot may be created at the block-level, such as where creation of the snapshot occurs without awareness of the file system. Each pointer points to a respective stored data block, so that collectively, the set of pointers reflect the storage location and state of the data block (e.g., file(s) or volume(s) or data set(s)) at a particular point in time when the snapshot copy was created.

Once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually later modified. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block changed to reflect the new location of that block. The snapshot mapping of file system data may also be updated to reflect the changed block(s) at that particular point in time. In some other cases, a snapshot includes a full physical copy of all or substantially all of the data represented by the snapshot.

A snapshot copy in many cases can be made quickly and without significantly impacting primary computing resources because large amounts of data are not copied or moved. In some embodiments, a snapshot may exist as a virtual file system, parallel to the actual file system. Users in some cases gain read-only access to the record of files and directories of the snapshot. By electing to restore primary data from a snapshot taken at a given point in time, users may also return the current file system to the state of the file system that existed when the snapshot was taken.

Replication Operations: Another type of secondary copy operation is a replication operation. Some types of secondary copies are used to periodically capture images of primary data at particular points in time (e.g., backups, archives, and snapshots). However, it can also be useful for recovery purposes to protect primary data in a more continuous fashion, by replicating the primary data substantially as changes occur. In some cases a replication copy can be a mirror copy, for instance, where changes made to primary data are mirrored or substantially immediately copied to another location (e.g., to secondary storage device(s)). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

Deduplication/Single-Instancing Operations: Another type of data movement operation is deduplication or single-instance storage, which is useful to reduce the amount of data within the system. For instance, some or all of the above-described secondary storage operations can involve deduplication in some fashion. New data is read, broken down into portions (e.g., sub-file level blocks, files, etc.) of a selected granularity, compared with blocks that are already stored, and only the new blocks are stored. Blocks that already exist are represented as pointers to the already stored data.

Information Lifecycle Management and Hierarchical Storage Management Operations: In some embodiments, files and other data over their lifetime move from more expensive, quick access storage to less expensive, slower access storage. Operations associated with moving data through various tiers of storage (e.g., as shown in FIG. 3) are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices to secondary storage devices, or between tiers of the same storage devices. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data or a secondary copy that is larger than a given size threshold or older than a given age threshold and that is stored in a backup format. Often, and unlike some types of archive copies, HSM data that is removed or aged from the source copy is replaced by a logical reference pointer or stub. The stub may also include some metadata associated with the corresponding data, so that a file system and/or application can provide some information about the data block and/or a limited-functionality version (e.g., a preview) of the data block. According to one example, files are generally moved between higher and lower cost storage depending on how often the files are accessed. An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

It will be understood to those skilled in the art that it is possible to employ "event" definitions that may capture a relatively broad or narrow set of data operations executed on a data storage system, allowing a user to customize the metadata collection system 351 to meet certain metadata collection goals. Such "event" definitions may define or describe data movement, changes, manipulations or other operations or interactions that may be of interest to a system user or administrator (e.g., any operation that "touches" data may be recorded along with the action or operation that caused the interaction (e.g. read, write, copy, parse, or the like). Moreover, change definitions may evolve over time or may be dynamic based on the entries sent to the metadata store 352. For example, if expected results are not obtained, change definitions may be modified or additional definitions used until appropriate or desired results are obtained. This may be accomplished, for example by globally linking certain libraries of "event" definitions and selectively enabling libraries on a rolling basis until acceptable results are achieved. This process may be performed after the initial activation of the metadata collection system 351 and periodically thereafter, depending on changing needs or objectives.

Moreover, in some embodiments, the system may support the use of "user data tags" that allow certain types of information stored in the data storage systems $320a$, $320b$ . . . $320n$ to be tagged so they may be identified and tracked throughout the system. As such, if a data block that includes a user data tag is touched, an event log is recorded and/or sent or collected by the metadata collection system 351. For example, a user may designate a particular type of data or information such as project information, or information shared between or accessed by particular group of users to be tracked across the system or through various levels of storage. This may be accomplished through a user interface that allows a user to define certain information to be tagged, for example, by using any available attribute within the system such as those specified above with respect to the classification agent or filter used in the system. In some embodiments, the user may define one or more tags using these or other attributes which may be further refined by combining them through the use of logical or Boolean operators to define a certain tag expression.

For example, a user may define a certain user data tag by specifying one or more criteria to be satisfied such as certain system users, a certain data permission level, a certain project, combinations of the same or the like. These criteria may be defined using logical operators such as AND or OR operators to conditionally combine various attributes to create a condition that defines a tag. In certain embodiments, information satisfying that criteria may be tagged and tracked within the system. For example, the metadata store 352 may contain entries keeping track of entries satisfying the tag criteria along with information relating to the types of operations performed on the information as well as certain metadata relating to the data content and its location in the data storage systems $320a$, $320b$ . . . $320n$. This allows the system to search the metadata store 352 at a particular level of storage for the information, and quickly locate it within mass storage device for potential retrieval.

Referring back to FIG. 3, metadata (system metadata and/or event metadata) collected by the metadata collection system 351 is stored in the metadata store 352 outside of the data storage systems $320a$, $320b$ . . . $320n$. In one or more embodiments, the metadata store 352 may be any type of data structure that allows for easy and efficient searching of the stored metadata. Examples may include, without limitation, relational database storage (e.g., SQL databases), key-value type storages (e.g., noSQL databases), columnar storages (e.g., parquet), or the like. The metadata store 352 may also include an index associated with each piece of metadata and stored with the metadata. The index may contain information such as each of the locations where the data set corresponding to the metadata is located, user access information describing which users are permitted to view the contents of the data set, type of data structure corresponding to the data set, or the like. The content index may be used to facilitate search and retrieval of a data set corresponding to metadata, such as in response to a user request to restore a particular file.

In one or more embodiments, the metadata store 352 may be a data structure in the form of a NoSQL ("Not-only-Structured-Query-Language") database. In one embodiment, the metadata store 352 is implemented using a NoSQL database that uses a key-value store, a document store, and/or a wide column store. Specifically, event metadata collected by the metadata collection system 351 may be stored in a NoSQL type database structure. A NoSQL database may be, by way of example, Cloudant® Apache Cassandra™, Object Storage, Apache HBase™, Hazelcast®, etc.

A NoSQL database provides a mechanism for storage and retrieval of data that is modeled in means other than the tabular relations used in relational databases. Typical motivations for this approach include simplicity of design, horizontal scaling, and finer control over availability. NoSQL databases have features of self-organizing, self-managing, low cost, high scalability, high concurrency, simply query relation, and so on. To compare a NoSQL database to a relational database, a form in the relational database usually stores a formatted data structure, and components of all entry fields are the same. Even if not every entry needs all fields, the relational database will allocate all fields to each entry. Such structure can potentially cause a performance bottleneck in a relational database. On the other hand, a NoSQL database typically carries out storage with a Key/Value pair, and its structure is not fixed. Each entry can have different fields, and each entry can add some key value pairs of its own according to a requirement so as not to be limited to the fixed structure and to thereby reduce some time and space overheads.

In an embodiment, an "entry" corresponding to an event may be a record in a NoSQL database, and can also be regarded as a data object instance in the NoSQL database. Each entry can possess a unique identifier (ID), and can comprise zero or more Key/Value pairs. Usage examples include storing millions of data records as key-value pairs in one or a few associative arrays. A key-value pair is a fundamental data representation in computing systems and applications, in which all or part of the data model may be expressed as a collection of tuples <attribute name, value>, for which each element is a key-value pair. An associative array is an unordered list of unique attributes with associated values. Such organization is particularly useful for statistical or real-time analysis of growing lists of data elements. According to an embodiment of the present invention, a pre-defined specificator can be used to distinguish between individual Key/Value pairs. For example, different Key/Value pairs are distinguished by a comma. Meanwhile, the "key" and the "value" within each Key/Value pair can be separated by a pre-defined delimiter, for example, a colon, thus the key in a Key/Value pair can be determined from the Key/Value pair according to the delimiter. At the same time, the "value" in a Key/Value pair can be extended by a pre-defined extension symbol, for example, square brackets which can be used to represent that the "value" in a Key/Value pair comprises more than two attributes. Each attribute in the more than two attributes can either be a real "value", or be a Key/Value pair in which the "value" can continue to comprise one or more attribute.

For example, metadata (event metadata, scan metadata and system metadata) may include one or more of the following keys and corresponding values:

| Keys | Values |
| --- | --- |
| Data Storage System | Identity of the Data Storage System on which the event was executed |
| Time Stamp | Time of event |
| File | File Name of the data set (or "file") or which the event was executed |
| Title | Title of the data set |
| Type | Type of content (e.g., document (WORD, PDF, etc.)/image (JPEG, GIFF, etc./video/email/web link/blog/or the like) |
| Size | Size of file/size of data corresponding to event execution |
| Time of creation | File Creation time |
| Owner | Creator of file (user name, client device, affiliation, department,or other user information etc.) |
| Author | Event executor (user name, client device, affiliation, or other user information etc.) |
| Event type | Copy/Read/Write/Modify/Delete/Print/Email/ etc. |
| Path | Data path corresponding to event (e.g., copy {F1} to {F2}) |
| Text | Text Excerpts |
| Tags | Keywords (e.g., financial, personal, sensitive, medical, etc.) and/or previously associated tags |
| Facets | Facets (e.g., social security number, patient name, etc.) |

It should be noted that the above key values are provided as way of example only and should not be considered limiting.

It will be understood to those skilled in the art that while other types of storing formats are not described here in detail, the metadata may be stored in other formats as well (e.g., SQL, Parquet, etc.).

In certain embodiments, the metadata management system 302 also includes a classifier 353 configured to apply custom tags (interchangeably referred to as tags) to the metadata before and/or after insertion by the metadata collection system 351 into the metadata store 352. In certain embodiments, the facets (described below) associated with the metadata that are indicative of the actual content in the data storage systems 320a, 320b . . . 320n that corresponds to the tagged metadata and/or the metadata itself may be used as tags.

In some embodiments, the classifier 353 analyzes characteristics, content, format, etc. of the metadata (and not the data itself) to add tags to the metadata. This provides enhanced search and management capabilities for data discovery and other purposes. The custom tags, in certain embodiments, significantly reduce the amount of time required to obtain information by reducing and/or substantially eliminating the need to obtain information directly from the source data. The tags can be used to identify files or other data blocks in the data storage systems 320a, 320b . . . 320n having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

For example, assume a system administrator desires to identify data sets that a certain user has interacted with, that contain content including certain keywords, content having characteristics, etc. Rather than search each file in each directory and/or all the metadata content, which can be a very time consuming process (especially when the data blocks reside on multiple storage devices or the metadata store includes large volumes of data in a schema-less database format), the system administrator may search the custom tags in the metadata store 352 to identify metadata that is associated with tags corresponding to the user, keywords and/or characteristics (by for example, defining a query), and may then look up data sets associated with that metadata.

Moreover, in certain embodiments, use of the custom tags in a metadata store 352 where the custom tags do not reside on a data storage system itself for satisfying data searches or queries may also reduce the involvement of network resources in this process, substantially reducing the processing burden on the host system. For example, as described above, if an administrator desires to identify certain data sets, querying the metadata store 352 rather than the file system virtually removes the host system from the query process (e.g., no brute force scanning of directories and files in the data storage systems is required), allowing the host system to continue performing host tasks rather than be occupied with search tasks.

The classifier 353 may apply the tags by analyzing the collected metadata (before and/or after insertion into the metadata store 352) and applying one or more user defined policies. Alternatively and/or additionally the classifier 353 may apply the tags automatically by analyzing the collected metadata (before and/or after insertion into the metadata store 352), and applying one or more classification rules automatically derived by the classifier 353 (e.g., based on machine learning, deep learning, text annotators, or the like). In yet another embodiment, the classifier 353 may analyze the content in the data storage systems 320a, 320b . . . 320n, and apply one or more classification rules automatically derived by the classifier 353 (e.g., based on machine learning, deep learning, text annotators, or the like) to tag collected metadata associated with that content. Different methods for applying the custom tags are described below in detail.

In an embodiment, where the classifier 353 may apply the tags by analyzing the metadata and applying one or more user defined policies, the classifier 353 may include and/or may be in communication with a policy engine 355. The policy engine 355 may include a set of user configurable policies. In these examples, a policy is a set of classification rules. The policy may also include any other data or parameters in addition to the set of classification rules that can be used to interpret how the metadata tags are to be assigned.

For example, a policy may include multiple rules for classifying metadata and/or may specify the tag(s) to be applied if the rule conditions are satisfied. For example, a user may specify a tag to be associated with a metadata based on one or more characteristics of the metadata.

In certain embodiments, the set of rules for a tag can be defined in a tag definition that is typed directly into a user interface program (e.g., a REST API, SDK, or the like) and written into the policy engine. In an alternative embodiment, the tag definition can be represented in a definition file. If a definition file is used, it can use the XML markup language or any document structure. In an embodiment, a user may create new customized tags. Alternatively and/or additionally, the user may be presented a list of pre-defined tags and the user may choose and/or modify such tags. The tags may be relevant to a user, task, business objective, or the like.

A user may define a classification policy by indicating criteria, parameters or descriptors of the policy via a graphical user interface that provides facilities to present information and receive input data, such as a form or page with fields to be filled in, pull-down menus or entries allowing one or more of several options to be selected, buttons, sliders, hypertext links or other known user interface tools for receiving user input. For example, a user may define tags "confidential" and "access level 2" if the metadata includes certain keywords (e.g., "confidential," or "privileged") and/or are associated particular flags (e.g., in metadata identifying a document or email as personal, confidential, etc.).

A policy defines a particular combination of rules, such as users who have created, accessed or modified a document or data block; file or application types; content or metadata keywords; clients or storage locations; dates of data creation and/or access; review status or other status within a workflow (e.g., reviewed or un-reviewed); modification times or types of modifications; and/or any other data attributes. A policy may also be defined using tags already associated with the metadata. For example, a rule may classify all metadata associated with an already assigned tag (e.g., "project"), and apply a second tag (e.g., a second tag "inactive" that corresponds to the status of projectX).

The various rules used to define a policy may be combined in any suitable fashion, for example, via Boolean operators, to define a complex policy. As an example, an E-discovery policy might define a tag "privileged" that is associated with documents or data blocks that (1) were created or modified by legal department staff (i.e., owner or creator in the metadata is associated with a defined name), (2) were sent to or received from outside counsel via email, and/or (3) contain one of the following keywords: "privileged" or "attorney," "counsel", or other terms.

Another type of tag which may be added is an entity tag. An entity tag may be, for example, any content that matches a defined data mask format. Examples of entity tags might include, e.g., social security numbers (e.g., based on a rule that any numerical content matching the formatting mask XXX-XX-XXXX), credit card numbers (e.g., based on a rule content having a 13-16 digit string of numbers), SKU numbers, product numbers, etc.

Policies may, in certain embodiments, may include one or more of the following classification rules for assigning tags to the metadata:
  i. frequency with which metadata and/or corresponding has been or is predicted to be used, accessed, or modified;
  ii. size of metadata;
  iii. user information that created, accessed, modified, or otherwise utilized content corresponding to the metadata (e.g., owner, creator, author, etc.): based on user name, user affiliation, user access level, etc.
  iv. time-related factors (e.g., aging information such as time since the creation or modification of a metadata);
  v. the identity of applications, client devices and/or other computing devices that created, accessed, modified, or otherwise utilized content corresponding to the metadata;
  vi. a relative sensitivity (e.g., confidentiality) of a data block, e.g., as determined by its content and/or metadata;
  vii. the current or historical storage capacity of various storage devices;
  viii. the current or historical network capacity of network pathways connecting various components within the storage operation cell;
  ix. access control lists or other security information;

x. already existing tags associated with the metadata; and/or xi. the content of metadata (e.g., keywords, tags, etc.).

In an embodiment, the policies defined by the user may also be in a key-value form (if metadata is stored in a noSQL database format), and the classifier 353 may search for the key-value in the metadata for application of a tag defined by the policy. In certain embodiments, the user may be prompted to define keys that are used by the metadata store 352 for sorting and storing the metadata. Optionally, a user may define any key, and the classifier 353 may apply the tag if a metadata entry includes either an exact match for the key-value included in the policy and/or if a key-value is similar to the key-value included in the policy. For example, if the policy includes a key-value "owner:bob" in the policy, the classifier may apply the tag if a metadata entry includes either an exact match for the key-value (i.e., owner:bob) included in the policy and/or a similar key-value (e.g., creator:bob; author:bob; etc.). In one or more embodiments, tagging guidance may be provided to a user for which the accuracy may increase with use, as the history of the user select tags builds up (e.g., using a feedback loop that provides user with guidance relating to most common keys in the metadata store 352).

For example, consider a user is creating documents for different enterprises having names "/usr/documents/IBM/"; /usr/documents/Company2/"; "/usr/documents/Company3/" etc. in a data storage system. The metadata collection system will receive event metadata corresponding to the creation of the documents that will include the document names, formats, sizes, date of creation, etc. The classifier 353 may add company name tags to the event metadata based on a user defined policy including rules for classifying metadata based on company name (by extracting the company name from the file names included in the event metadata). Another tag describing the document format may also be added (e.g., docx, pdf, etc.).

In certain embodiments, tagging based on user-defined policies may be performed for event metadata upon receipt of event metadata for each event by the metadata collection system 351 (e.g., on a first-in, first-out flow) before insertion into the metadata store 352. Alternatively and/or additionally, tagging based on user-defined policies may be performed for event metadata periodically; or upon occurrence of certain conditions (e.g., receipt of user instructions) before (e.g., in a queue) and/or after insertion into the metadata store 352. Similarly, tagging based on user-defined policies may be performed for scan metadata upon receipt of scan metadata every time a scan is performed by the metadata collection system 351 (e.g., on a first-in, first-out flow) before insertion into the metadata store 352. Alternatively and/or additionally, tagging based on user-defined policies may be performed for scan metadata periodically; or upon occurrence of certain conditions (e.g., receipt of user instructions) before (e.g., in a queue) and/or after insertion into the metadata store 352.

In certain embodiments, the classifier 353 may apply the tags automatically by analyzing the metadata collected by the metadata collection engine 351 before and/or after insertion into the metadata store 352, and applying one or more classification rules automatically derived by the classifier 353. It should be noted that data included in certain components of metadata contain meaningful information that is indicative of important facets of the contents corresponding to the metadata, and which can be extracted and analyzed without extracting information from the contents itself (e.g., files and objects). For example, file system path information, file name, object bucket/container information, object name, owner information, event information, or the like included in the metadata may include information about important facets of the contents corresponding to the metadata and/or the metadata itself. A facet may comprise a specific type of information about content to be determined from metadata components and may include words, phrases, or other data descriptors identifying unique features of a document/data/content/metadata/etc. For instance, a facet may comprise a characteristic of metadata or content type determined by text analytics (e.g., sensitive, privileged, or the like). Other examples of such facets may include, without limitation, organization names, content type, location, user information, or the like. Facets may be words, phrases, or other data extracted directly from the metadata (e.g., owner name, entity name, document type, etc.) and/or words, phrases, or other descriptors derived based on information included in the metadata.

In an embodiment, the classifier 353 may include a data miner 356 (e.g., text miner, image miner, audio miner, video miner, and/or the like) to apply data analytics to the components of the metadata to determine facets associated with the content corresponding to the metadata. Data analytics provides techniques to convert textual, audio, video or speech data into structured data by extracting information e.g., person names, addresses, etc. and classifying content into categories based on the data and content (i.e., facets).

The data miner 356 may comply with the Unstructured Information Management Architecture (UIMA), and include such annotators as a language identification annotator to identify the language of metadata; a linguistic analysis annotator to apply linguistic analysis to the metadata; a dictionary lookup annotator to match words and synonyms from a dictionary with words in the content of the metadata and to associate keywords with user-defined facets; a named entity recognition annotator to extract person names, locations, and company names; or the like. It should be understood that any text analytic technologies similar to UIMA may be employed to accomplish the techniques described herein. For example, other off-the-shelf analytics applications or custom software and/or hardware may be used instead of, or in addition to, UIMA.

As is known to those skilled in the art, UIMA developed by IBM Corporation (Armonk, N.Y.) is an open platform for creating, integrating and deploying unstructured information management solutions from combinations of semantic analysis and search components to discover patterns. It allows easy authoring of annotators, such as the expression of the format of telephone numbers, or dates, or meeting rooms. Then, given a set of text documents, the UIMA tool applies the various annotators authored, thereby automatically annotating segments of text by different annotations as authored. IBM product platforms that expose the UIMA interfaces include the OmniFind Enterprise Edition and Analytics Edition. The former features UIMA for building full-text and semantic search indexes, and the latter deploys UIMA for information extraction and text analysis. The annotators may be driven off of entity spotting, using Information Extraction (IE) techniques, and/or using natural language mining (NLM) techniques.

For example, in certain embodiments, the classifier 353 may pre-determine categories such as "sensitive", "enterprise", "medical content", or the like. Further, each category may be associated with a particular annotator in the data miner 356. An annotator can be any combination of dictionaries, parsing rules, character rules, language identification, semantic analysis, and the like. For example, a "Medical Content" category may include dictionaries for topics such as surgery, patient, physician, medicine, medical, and the like. In certain embodiments, custom dictionaries may also be leveraged to classify data. For example, a custom dictionary that contains terms found in the code development environment may be used and may include terms such as ISO, src, software development project names, acronyms associated with development environments (e.g., PMR, etc.). In one embodiment, a user may also manually specify a category. Annotators may also be defined that derive relationships in between terms as well.

It should be noted that dictionary entries may be in the form of a noun, verb, list of causes, and a causation time frame. The dictionary may also contain other data such as parts of speech (e.g., adjectives, adverbs, etc.), phrases, etc. The dictionary may also contain more complex grammar-like constructs. For example, the dictionary may contain noun alternatives and plurals, verb conjugations, and conjunctions or other Boolean terms (e.g., not, or, and, and exclusive-or). The dictionary may be in any format (e.g., plain text, relational database tables, nested XML code, etc.). Any number of dictionaries may be used for analysis. Hence, the system enables the use of dictionary based annotators, entity based annotators or extraction (e.g., organizations, people, location, etc.), in addition to the ability to create custom annotators based on linguistic nuances and terms of specific industries as part of the classification process. In certain embodiments, the facets extracted may be used to tag the metadata and/or identify a different tag, which may be used for retrieval of content corresponding to the data. Alternatively and/or additionally, facets may be added to a metadata entry in the metadata store 352 before and/or after insertion into the metadata store 352.

In one or more embodiments, the classifier 353 may also include a rules engine 357 configured to analyze the facets extracted by the text miner 356 to classify the content corresponding to the metadata, and apply custom tags to the metadata (discussed below). Specifically, a tag may be added based on one or more characteristics of the extracted facets. For example, in the above dictionary examples for code development environment, if International Organization for Standardization (ISO) and problem management report (PMR) words are present (extracted facets), the rules engine 357 may tag the metadata with "sensitive" tag indicating that the corresponding content includes sensitive data. Similarly, if the extracted facets include person names that are associated with an entity, the rules engine 357 may tag the metadata with "entity name" tag indicating that the corresponding content is associated with the entity. As such, the classifier 353 may add 'tags' to entries in the metadata store 352 for identifying various matched concepts (based on facet analysis) and/or to map the entries to standardized resources. In another example, if the extracted facets include medical information and a patient name, the rules engine 357 may apply tags such as confidential, personal information, etc.

The rules engine 357 may utilize a process of recognizing the relationships, predicates, or dependencies of components of the metadata and/or facets, and thereby extract new, hidden, indirect, or detailed structural information to classify the extracted metadata and apply a tag. For example, the rules engine 357 may include an NLP component that evaluates the extracted facets and may determine whether the facets include a term from a given dictionary in relationship (e.g., immediately followed by) with a term from a related dictionary. If the metadata component satisfies that parsing rule, then the NLP component determines a likelihood that content is about the subject matter based on correlations. If the likelihood exceeds a threshold, the NLP component applies a tag to the event metadata that is indicative of a property of the subject matter. For example, if the metadata includes a file system path that belongs to an entity recognized as a law firm, and the file name includes "non-infringement opinion"; the classifier may extract facets such as legal document, opinion, client information, etc.; and the rules engine may analyze the facets and their relationships to identify tags such as confidential, attorney client privileged, work product, legal opinion, or the like. In certain embodiments, the facets may also be used as tags.

While the above disclosure describes using text miners to extract facets from the metadata, other methods such as deep semantic relationship detection and analysis. machine learning, or the like are within the scope of this disclosure.

While the above disclosure describes adding tags to the metadata by analyzing the contents of the metadata itself, the disclosure is not so limiting. In certain embodiments, the system may also analyze specific contents of the data storage systems 320a, 320b . . . 320n to extracts facets of the contents, and use the facets to add one or more tags to the metadata corresponding to the content in the metadata store 352. In an embodiment, the metadata management system 302 may include a facet extraction engine 358 configured to analyze content stored in the data storage systems 320a, 320b . . . 320n to extract facets. Facets may include various dimensions of the content such as, without limitation, users, keywords, time stamps, entity names, document type, or the like. In some embodiments, the extracted facets may be utilized as tags in the in the metadata store 352. Alternatively and/or additionally, the rules engine 357 may use the extracted facets to identify one or more tags to be added to the metadata (as described above).

In certain embodiments, the facet extraction engine 358 may extract facets by analyzing the contents of files, objects, etc. stored in the in the data storage systems 320a, 320b . . . 320n. Alternatively and/or additionally, the facet extraction engine 358 may extract facets from, for example, metadata associated with the files, objects, file systems, object containers, storage devices, data storage systems, or the like, that resides in the data storage systems 320a, 320b . . . 320n, For example, the facet extraction engine 358 may extract facets from file headers, object names, etc. that may include metadata (e.g., size, date of creation, date of modification, author, entity, storage location, etc.) about the file or object and its contents. For example, most image file headers store information about image format, size, resolution and color space, and optionally authoring information such as who made the image, when and where it was made, what camera model and photographic settings were used (Exif), and so on. Such metadata may be used by the facet extraction engine 358 to extract facets of the contents of the file or object itself.

In certain embodiments, the contents of the data storage systems 320a, 320b . . . 320n that may be analyzed for extracting content facets may be identified based on a data operation to be performed. For example, if the information system 300 receives a request to perform a data operation on certain data sets stored in one or more of the data storage systems 320a, 320b . . . 320n, the system may analyze those data sets to extract content facets corresponding to the data sets before performing the data operation. For example, if a user requests that sensitive content included in a storage subsystem of data storage system 320a must be encrypted, the facet extraction engine 358 may analyze content of that storage subsystem, without limitation, entity information, user information, keywords, or the like that indicate that the content is sensitive. Other data operation requests may include, without limitation, backup, archive, deduplication, or the like.

In one or more embodiments, the facet extraction engine 358 may perform facet extraction using supervised learning, unsupervised learning and/or deep inspection methods (including, for example, the data mining methods described above). For example, the facet extraction engine 358 may utilize the supervised and/or unsupervised learning methods for named entity extraction and/or classification. Named entity recognition and classification are important aspects of information extraction to identify information units such as people, organizations, location names, and numeric expressions for time, money and numbers from unstructured text. Typically, information units or numeric expressions are first extracted out as named entities from the unstructured text (i.e., named entity recognition), followed by learning a function from an entity to its type, which is selected from predefined categories such as: People, Organizations, Locations, Products, Genes, Compounds, and Technologies, etc. (i.e., named entity classification). There are several kinds of learning methods depending on the availability of training examples. Supervised learning methods infer rules from positive and negative examples of named entities over a large collection of annotated documents for each entity type. Supervised learning requires a large annotated corpus and thus is impractical where manually generated labels are not available or are difficult to generate. Unsupervised learning methods apply clustering technology to automatically gather entities from clusters.

For example, a machine learning system 358 may be IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Figure 4:
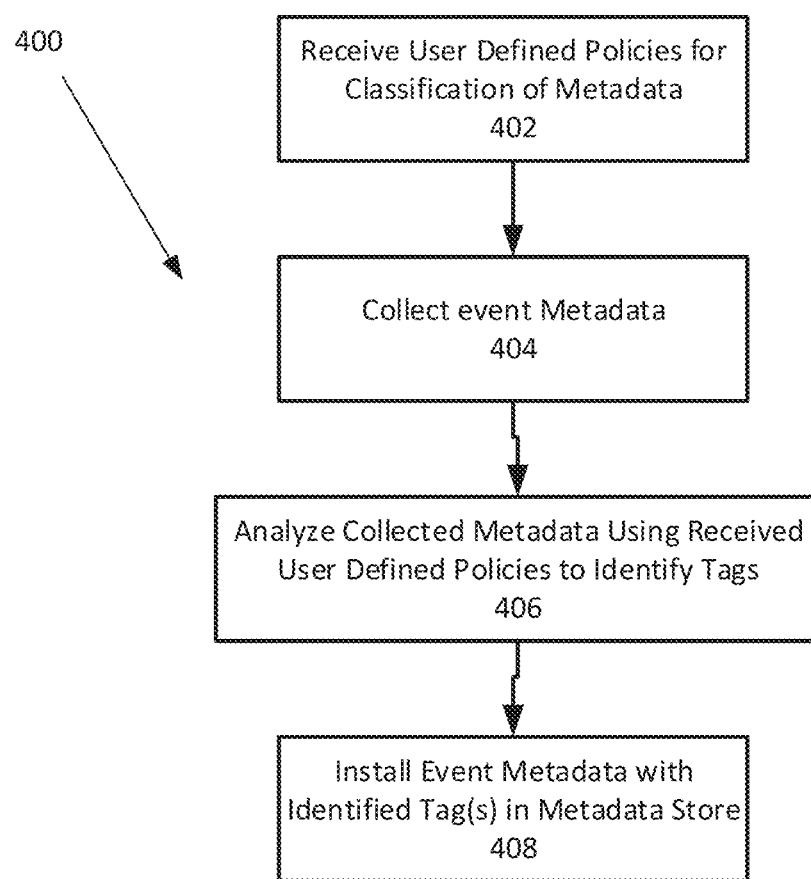
FIG. 4 is an exemplary flowchart illustrating and describing a method of applying custom tags to metadata in the metadata store according to embodiments of the present disclosure.

Referring now to FIG. 4, an exemplary flowchart in accordance with various embodiments illustrating and describing a method of applying custom tags to event metadata in the metadata store 352 is described. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4 but the process may be integrated and/or one or more steps may be performed together, simultaneously, or the steps may be performed in the order disclosed or in an alternate order.

At step 402, the metadata management system may receive user defined policies that includes a collection of classification rules and corresponding metadata tags for classification of metadata. As discussed above the user may provide the policies via a user interface such as a REST-API.

At step 404, the metadata management system may collect event metadata from one or more data storage systems. As discussed above, the metadata management system may collect the event metadata (i.e., metadata corresponding a data operation executed on a data storage system) upon occurrence of every new event and/or periodically. The metadata management system may collect the event metadata by configuring the data storage systems to send event metadata to the metadata collection system of the metadata management system and/or by monitoring various data operations executed on the data storage systems or the network.

At step 406, the metadata management system may analyze the received event metadata using the user defined policies to identify various tags to be applied to the received event metadata. For example, a policy may include the following classification rule and the corresponding tag information:
owner:bob AND tag1:U* AND size:[4000 TO 6000]
"tag1": "myFirstTag",
"tag2": 25

The metadata management system may then analyze the received metadata for "owner:bob AND tag1:U* AND size:[4000 TO 6000]", and if a match is found, may apply a tag1 as "myFirstTag" and a tag 2 as "25" to the event metadata. In an embodiment, the tag may provide information about the content corresponding to the metadata.

In certain embodiments, the system may analyze the received event metadata in first-in, first-out manner. However, other orders for analyzing the data are within the scope of this disclosure.

At step 408, the metadata management system may install the event metadata in a database with the assigned tag in an appropriate format. For example, if the database is in the form of a key-value pair noSQL database, the system may sort and save the event metadata in the form of various key-value pairs as described above. Furthermore, the tag(s) may also be applied as key-value pair(s).

Figure 5:
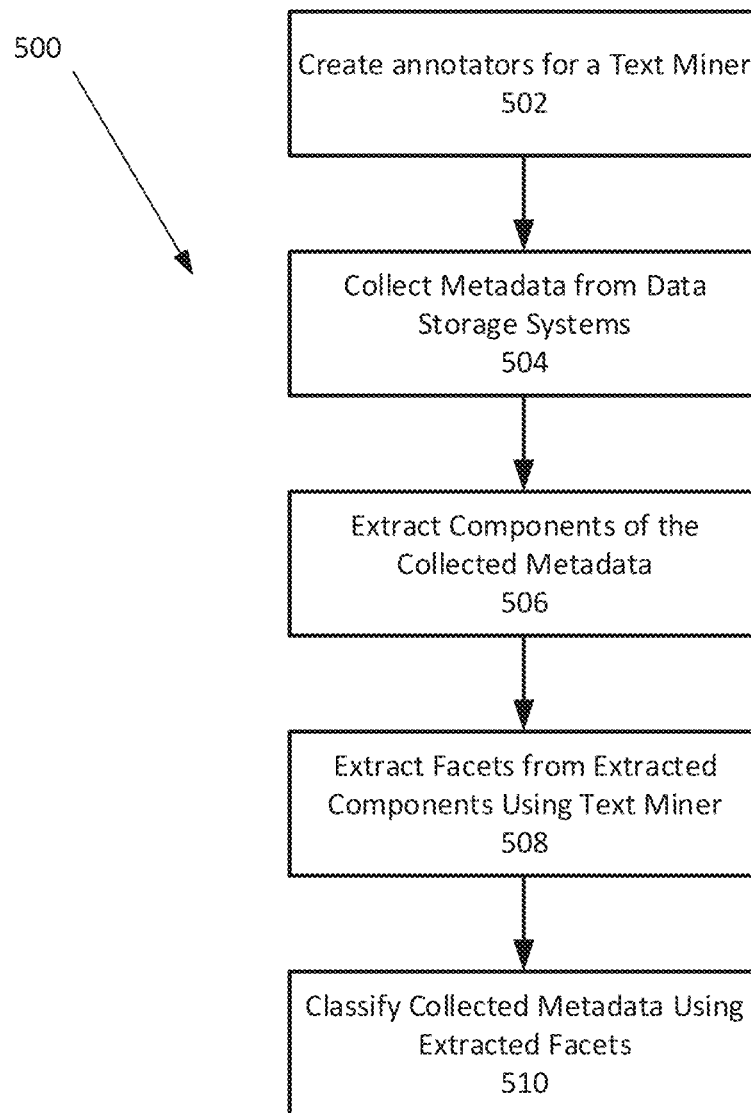
FIG. 5 is an exemplary flowchart illustrating and describing another method of applying custom tags to metadata in the metadata store according to embodiments of the present disclosure.

Referring now to FIG. 5, an exemplary flowchart in accordance with various embodiments illustrating and describing a method of applying custom tags to event metadata in the metadata store 352 is described. While the method 500 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5 but the process may be integrated and/or one or more steps may be performed together, simultaneously, or the steps may be performed in the order disclosed or in an alternate order.

At step 502, the metadata management system may create annotators (dictionary based, entity based, custom, or the like) for classifying metadata stored in the metadata management system. As discussed above, the annotators may be created based on the classification requirements. For example, if classification is to be performed to differentiate content associated with different entities or authors, an annotator may be created that identifies the occurrence of various entity/author names in the metadata.

At step 504, the metadata management system may collect metadata from one or more data storage systems. The metadata may include system metadata, scan metadata, and/or event metadata. As discussed above, the metadata management system may collect the event metadata (i.e., metadata corresponding a data operation executed on a data storage system) upon occurrence of every new event and/or periodically. The metadata management system may collect the event metadata by configuring the data storage systems to send event metadata to the metadata collection system of the metadata management system and/or by monitoring various data operations executed on the data storage systems or the network. Similarly, the metadata management system may collect the scan metadata periodically.

At step 506, the system may extract certain components of the collected metadata. Examples of the extracted components may include, without limitation, file name, file system path, owner information, file size, modification history, object name, object bucket/container information, or any other components that may provide information indicative of content corresponding to the metadata.

At step 508, the metadata management system may extract facets from the extracted components of the metadata by passing the components through a classifier (e.g., UIMA), as discussed above. In certain embodiments, the metadata management system may add the extracted facets to the collected metadata as additional information during insertion into the metadata store.

At 510, the metadata management system, in an embodiment classifies the metadata using the extracted facets and in an aspect adds custom tags to the metadata, as discussed above. For example, if the facets include a medical practitioner's name and test reports extracted from the metadata of a documents (e.g., from owner information and the file name information), the metadata management system may identify the corresponding document to include patient information, and may apply tags such as confidential, privileged, patient personal information (PII), medical, or the like. Additionally and/or alternatively, the facets themselves may be used as tags—for example, the medical practitioner's name may be used as a tag to identify all documents that the medical practitioner has created/modified.

While the above disclosure describes various methods for collecting, storing, and analyzing metadata corresponding to contents of one or more data storage systems 320a, 320b . . . 320n for adding custom tags to the collected metadata, there is also a need to replicate or copy already created tags for metadata in response to various data operations performed on data corresponding to the metadata, without repeating the above methods. Specifically, since the tags are not stored with a data set in the data storage system itself, the metadata management system 302 must be able to replicate the metadata tags for metadata corresponding to the data set even if the location of the data set is updated and/or copies are created in the information management system 300.

For example, a tiered storage system provides a method for storing data hierarchically across multiple storage tiers, such as flash storage, disk storage, and tape storage, and data sets may be moved from one tier to another. In other words, different categories of data may be assigned to different types of storage media based on levels of protection needed, performance requirements, frequency of use, etc. For example, a database requiring high performance may be stored on higher tier storage media (with lowest latency), like SSDs; whereas archival data that is less frequently accessed, and tolerant to higher access latency, can be stored on cheaper storage media, such as tapes. In such a system, the metadata management system 302 must be able to copy the metadata tags created for data stored in one storage tier when it is moved to another storage tier, without performing the tagging steps again.

Figure 6:
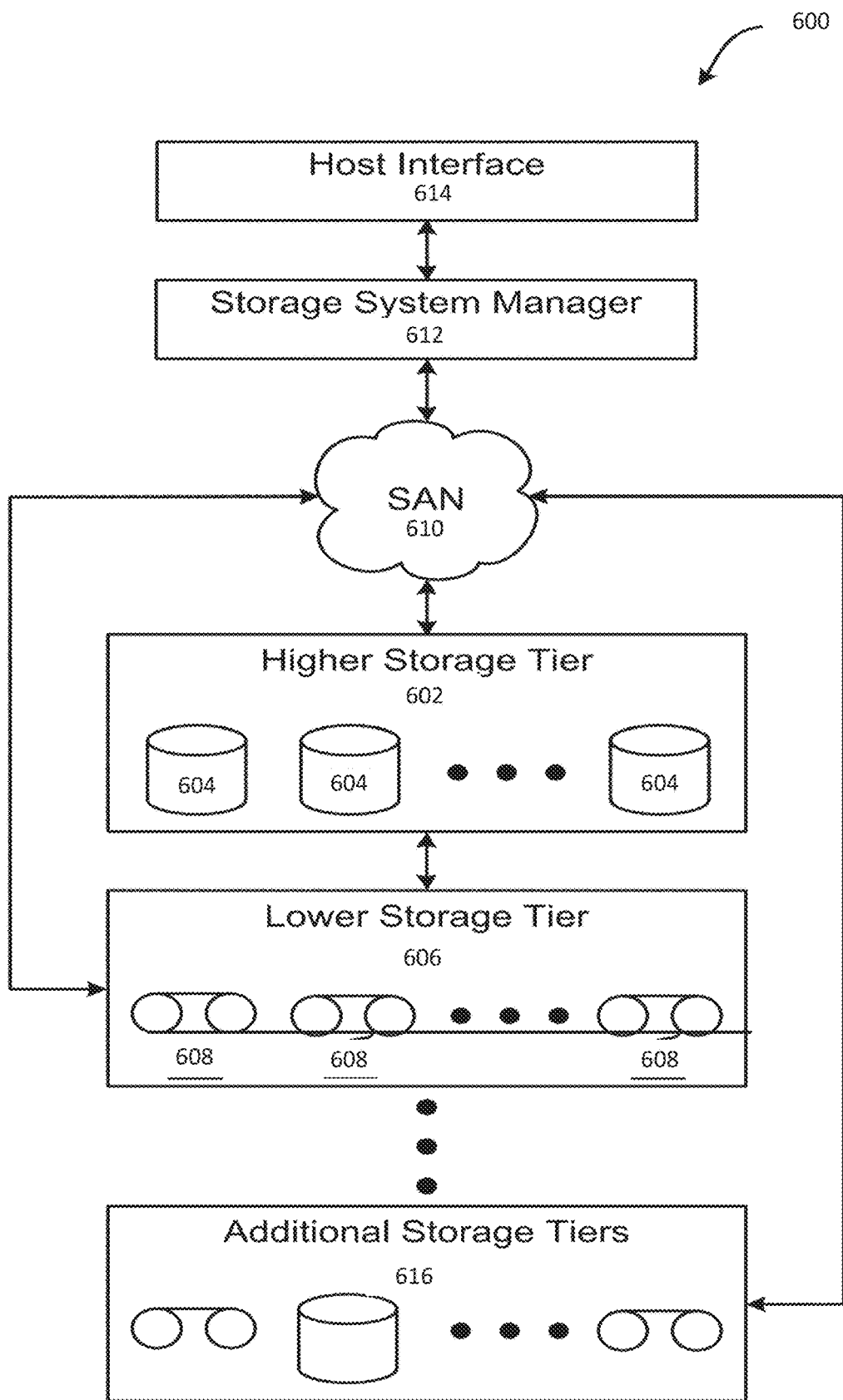
FIG. 6 depicts an example block diagram of a tiered storage system, according to embodiments of the present disclosure.

Now referring to FIG. 6, a tiered storage system 600 is shown according to one embodiment. The storage system 600 may be included in any of the data storage systems 320a, 320b . . . 320n. Note that some of the elements shown in FIG. 6 may be implemented as hardware and/or software, according to various embodiments. The tiered storage system 600 may include a storage system manager 612 for communicating with a plurality of media on at least one higher storage tier 602 and at least one lower storage tier 606. The higher storage tier(s) 602 preferably may include one or more random access and/or direct access media 604, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 606 may preferably include one or more lower performing storage media 608, including sequential access media such as magnetic tape in tape drives and/or optical media, slower accessing HDDs, slower accessing SSDs, etc., and/or others noted herein or known in the art. One or more additional storage tiers 616 may include any combination of storage memory media as desired by a designer of the storage system 600. Also, any of the higher storage tiers 602 and/or the lower storage tiers 606 may include a combination of storage devices and/or storage media.

The storage system manager 612 may communicate with the storage media 604, 608 on the higher storage tier(s) 602 and lower storage tier(s) 606 through a network 610, such as a storage area network (SAN), as shown in FIG. 6, or some other suitable network type. The storage system manager 612 may also communicate with one or more host systems (not shown) through a host interface 614, which may or may not be a part of the storage system manager 612. The storage system manager 612 and/or any other component of the storage system 600 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the tiered storage system 600 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 602, may include a majority of SSD storage media for storing data in a higher performing storage environment, and remaining storage tiers, including lower storage tier 606 and additional storage tiers 616 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 602, while data not having one of these attributes may be stored to the additional storage tiers 616, including lower storage tier 606. Of course, one of skill in the art, upon reading the present descriptions, may devise many other combinations of storage media types to implement into different storage schemes, according to the embodiments presented herein.

In another example, data movement may happen when a backup copy of a data set or content is created in the same data storage system and/or in another data storage system (as discussed above). As such, the metadata management system 302 (external to the source and destination data storage systems) must be able to copy or import the metadata and/or the metadata tags created for data stored in the source storage system when it is moved to the destination storage system, without performing the tagging steps again.

Figure 7:
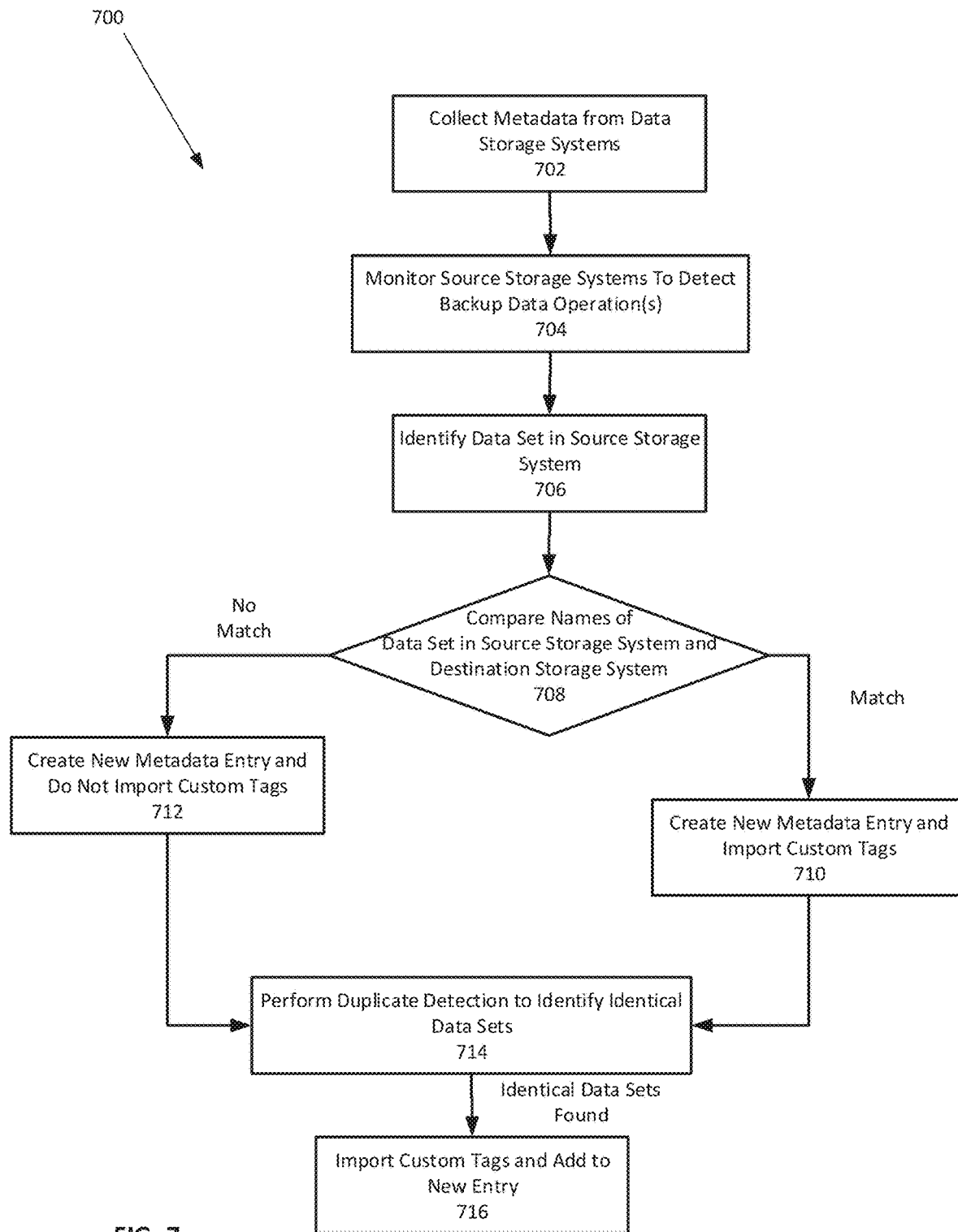
FIG. 7 is an exemplary flowchart illustrating and describing a method of custom metadata inheritance during execution of a backup operation according to embodiments of the present disclosure.

Referring now to FIG. 7, an exemplary flowchart in accordance with various embodiments illustrating and describing a method of metadata tag inheritance during execution of a backup data operation is disclosed. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7 but the process may be integrated and/or one or more steps may be performed together, simultaneously, or the steps may be performed in the order disclosed or in an alternate order.

At step 702, the metadata management system may collect metadata corresponding to data sets in a storage system, and add tags to the collected metadata, as described above.

At step 704, the metadata management system may monitor the source storage system to detect the execution of a backup command that causes creation of a backup of a data set in a destination location. For example, the data storage systems may be configured to send an event notification to the metadata management system if a backup operation is executed on data residing in the data storage systems. The event notification may be sent as a single event (e.g., high level backup) and/or as a series of events (e.g., backup at a file/object level). The event notification may include information relating to the backup operation such as, without limitation, identification of destination location where a backup copy of the data is stored, identification of the data set, or the like. In certain embodiments, most commonly used backup locations may also be configured to send a notification to the metadata management system if a backup operation is performed to store data to those locations.

It will be understood to those skilled in the art that movement of data between storage systems may be caused by certain backup commands such as, for example and without limitation, BACKUP, ARCHIVE, in conjunction with other data operations, or the like.

Upon detection of execution of a backup command, the metadata management system may identify (706) the data set in the source location on which the backup is executed. As discussed above, the data storage system may send event metadata corresponding to the backup executed to the metadata management system. Hence, the metadata management system may retrieve the identity of the data sets by, for example, extracting the information from event metadata corresponding to the backup received from the data storage system and/or from the backup operation command. Alternatively and/or additionally, the data storage system may provide the identity of the data sets to the metadata management system At 708, the metadata management system may then compare the names of the identified data set (e.g., file name, object name, etc.) in the source location and the destination location (706). The metadata management system may identify the name of the data set in the destination location by querying the data storage system, the backup storage location, extract from the data operation command, or the like.

If the names of the data set executed upon in the source location and the destination location match (i.e., 708: MATCH), the metadata management system may create a new metadata entry in its metadata store corresponding to the data set in the destination location, and import the metadata and/or metadata tags from an entry corresponding to the data set in the source location to the new entry (710). It will be understood to those skilled in the art, that the names are matched to ensure that the contents of the data set have not changed between the source and destination systems and the tags are still applicable. In certain embodiments, in addition to importing the metadata tags in the new entry, the metadata management system may also add new tags corresponding to event metadata corresponding to the backup executed, using the methods described above.

At 712, if the names of the data set executed upon in the source location and the destination location do not match (i.e., 708: NO MATCH), the metadata management system may create a new metadata entry in its metadata store corresponding event metadata of the backup executed and/or the destination data set. The system may identify new tags for the newly created entries using the methods described above.

At 714, the metadata management system may also perform duplicate detection across all the data storage systems it manages to determine if other data sets that are identical to the destination data set exist. The metadata management system may perform duplicate detection using any now or hereafter known methods. For example, the metadata management system may search for matches for the name of the destination data set in the metadata store and/or the data storage system, and may perform a content search of the data sets that have a name that is identical to that of the destination data set.

At 716, if one or more data sets that are identical to the destination data set exist (714: YES), the metadata detection system may identify metadata entries corresponding to each of the one or more data sets, and may import metadata and/or tags from the metadata entry having the oldest time stamp to the metadata entry created for the destination data set (i.e., the entry with the newest time stamp).

It will be understood to those skilled in the art that the duplicate identification and metadata import or inheritance may be performed every time the metadata collection system receives new event metadata (not just concerning movement of data between storage systems), and/or periodically, in order to avoid repetitive processing and tagging of metadata for the same content or data sets.

While the illustrative embodiments described above are preferably implemented in hardware, such as in units and circuitry of a processor, various aspects of the illustrative embodiments may be implemented in software as well. For example, it will be understood that each block of the flowchart illustrations in FIGS. 4, 5, and 7, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-executed method comprising:
    maintaining a plurality of data storage systems for storing electronic data, each of the plurality of data storage systems having one or more processors having circuits and logic for processing information and performing logic operations;
    maintaining an external metadata system separate from and in communication with the plurality of data storage systems, wherein the metadata management system has one or more processors having circuitry and logic for processing information and performing logic operations;
    operating the metadata management system to collect and store metadata corresponding to all the electronic data residing on the plurality of data storage systems as a plurality of metadata entries in the metadata management system, wherein each of the plurality of metadata entries in the metadata management system comprises metadata, wherein operating the metadata management system comprises applying one or more custom metadata tags by the metadata management system to each metadata entry in the metadata system, wherein applying the one or more custom metadata tags to each metadata entry comprises analyzing the metadata in a respective metadata entry to derive the one or more custom metadata tags to apply to the respective metadata entry, and the one or more custom metadata tags are associated with and relate to the metadata in the metadata entry;
    detecting execution of a backup data operation command on a data set of the electronic data residing in at least one data storage system of the plurality of data storage systems that causes creation of a backup copy of the data set in the at least one data storage system in a destination back-up data storage system, wherein the destination back-up data storage system has one or more processors having circuitry and logic for processing information and performing logic operations; and
    in response to detecting the execution of the backup data operation command, creating, by the metadata management system, a new metadata entry in the metadata management system corresponding to the execution of the backup data operation command, wherein the new metadata entry includes applying at least one custom metadata tag to the metadata entry before execution of the backup data operation command.

2. The method of claim 1, wherein operating the metadata management system to collect and store metadata corresponding to all the electronic data residing on the plurality of data storage systems as a plurality of metadata entries comprises:
    receiving, by the metadata management system, event metadata from one or more of the plurality of data storage systems;
    adding, by the metadata management system, a custom event metadata tag to the received event metadata to form tagged event metadata; and
    storing the tagged event metadata in the metadata management system.

3. The method of claim 2, wherein adding, by the metadata management system, a custom metadata tag to the received event metadata comprises:

receiving, from a user, at least one policy that comprises:
  a plurality of classification rules, and
  at least one custom event metadata tag associated with each of the plurality of classification rules;
analyzing, by the metadata management system, the received event metadata to determine if the received event metadata satisfies one or more of the plurality of classification rules; and
in response to determining that the received event metadata satisfies one or more of the plurality of classification rules, adding, by the metadata management system, the at least one custom event metadata tag associated with each of the one or more of the plurality of classification rules to the received event metadata.

4. The method of claim 1, wherein analyzing the metadata comprises at least one of the group consisting of analyzing: metadata content, metadata characteristics, components of metadata, format of the metadata; and combinations thereof.

5. The method of claim 1, wherein operating the metadata management system to collect and store metadata corresponding to all the electronic data residing on the plurality of data storage systems as a plurality of metadata entries comprises:
  receiving, by the metadata management system, metadata from one or more of the plurality of data storage systems;
  extracting, by the metadata management system, one or more components of the received metadata; and
  using, by the metadata management system, at least one annotator to identify facets from the extracted one or more components of the received metadata.

6. The method of claim 5, further comprising:
classifying, by the metadata management system, the received metadata based on the identified facets; and
adding, by the metadata management system, one or more custom metadata tags to one or more of the metadata entries in the metadata management system based upon the identified facets.

7. The method of claim 1, wherein creating by the metadata management system a new metadata entry in the metadata management system corresponding to the execution of the backup data operation command, wherein the new metadata entry includes applying at least one custom metadata tag to the metadata entry before execution of the data operation command, comprises:
  identifying, by the metadata management system, one or more source custom metadata tags included in metadata corresponding to the data set;
  determining, by the metadata management system, whether the data set in the at least one data storage system matches a destination data set in the destination back-up data storage system after the execution of the backup data operation command; and
  in response to determining that the data set in the at least one data storage system matches a destination data set in the destination back-up data storage system after the execution of the backup data operation command, adding the one or more source custom metadata tags to the new metadata entry in the metadata management system.

8. The method of claim 7, wherein determining, by the metadata management system, whether the data set in the at least one data storage system matches the destination data set in the destination back-up data storage system after the execution of the data operation command comprises determining whether a name of the data set in the at least one data storage system matches a name of the destination data set.

9. The method of claim 1, wherein the backup data operation is selected from the group comprising: BACKUP, and ARCHIVE.

10. The method of claim 1, further comprising:
performing, by the metadata management system, a duplicate data set detection across the plurality of data storage systems to determine if one or more duplicate copies of the data set exist;
in response to determining that one or more duplicate copies of the data set exist, extracting, by the metadata management system, at least one custom metadata tag from metadata corresponding to an oldest of the one or more duplicate copies; and
adding the extracted at least one custom metadata tag to the new metadata entry in the metadata management system.

11. A non-transitory computer readable medium comprising programming instructions that when executed cause a processor to:
  maintain a plurality of data storage systems for storing electronic data in communication with an external metadata management system;
  operate the metadata management system to collect and store metadata corresponding to all the electronic data residing on the plurality of data storage systems as a plurality of metadata entries in the metadata management system, wherein each of the plurality of metadata entries in the metadata management system comprises metadata, wherein operating the metadata management system comprises applying one or more custom metadata tags by the metadata management system to each metadata entry in the metadata management system, wherein applying the one or more custom metadata tags to each metadata entry comprises analyzing the metadata in a respective metadata entry to derive the one or more custom metadata tags to apply toe he respective metadata entry, and the one or more custom metadata tags are associated with and relate to the metadata in the metadata entry;
  detect execution of a backup data operation command on a data set in at least one data storage system of the plurality of data storage systems that causes creation of a backup copy of the data set in the at least one data storage system in a destination back-up data storage system; and
  in response to detecting execution of the backup data operation command, create, by the metadata management system, a new metadata entry in the metadata management system corresponding to the execution of the backup data operation command, wherein the new metadata entry includes applying at least one custom metadata tag to the metadata entry before execution of the backup data operation command.

12. The non-transitory computer readable medium of claim 11, wherein instructions that when executed cause the processor to operate the metadata management system to collect and store metadata corresponding to all the electronic data residing on the plurality of data storage systems as a plurality of metadata entries comprises instructions that when executed cause the processor to:
  receive, by the metadata management system, event metadata from one or more of the plurality of data storage systems;
  add, by the metadata management system, a custom event metadata tag to the received event metadata to form tagged event metadata; and store the tagged event metadata in the metadata management system.

13. The non-transitory computer readable medium of claim 12, wherein instructions that when executed cause the processor to add, by the metadata management system, a custom metadata tag to the received event metadata comprises instructions that when executed cause the processor to:
receive, from a user, at least one policy that comprises:
a plurality of classification rules, and
at least one custom event metadata tag associated with each of the plurality of classification rules;
analyze, by the metadata management system, the received event metadata to determine if the received event metadata satisfies one or more of the plurality of classification rules; and
in response to determining that the received event metadata satisfies one or more of the plurality of classification rules, add, by the metadata management system, the at least one custom event metadata tag associated with each of the one or more of the plurality of classification rules to the received metadata.

14. The non-transitory computer readable medium of claim 11, wherein instructions that when executed cause the processor to operate the metadata management system to collect and store metadata corresponding to all the electronic data residing on the plurality of data storage systems as a plurality of metadata entries comprises instructions that when executed cause the processor to:
receive, by the metadata management system, metadata from one or more of the plurality of data storage systems;
extract, by the metadata management system, one or more components of the received metadata; and
use, by the metadata management system, at least one annotator to identify facets from the extracted one or more components of the received metadata.

15. The non-transitory computer readable medium of claim 14, further comprising instructions that when executed cause the processor to:
classify, by the metadata management system, the received metadata based on the identified facets; and
add, by the metadata management system, one or more custom metadata tags to one or more of the metadata entries in the metadata management system based upon the identified facets.

16. The non-transitory computer readable medium of claim 11, wherein instructions that when executed cause the processor to create by the metadata management system a new metadata entry in the metadata management system corresponding to the execution of the backup data operation command, wherein the new metadata entry comprises at least one custom metadata tag created before the execution of the backup data operation command, comprises instructions that when executed cause the processor to:
identify, by the metadata management system, one or more source custom metadata tags included in metadata corresponding to the data set;
determine, by the metadata management system, whether the data set in the at least one data storage system matches a destination data set in the destination backup data storage system after the execution of the backup data operation command; and
in response to determining that the data set in the at least one data storage system matches a destination data set in the destination back-up data storage system after the execution of the backup data operation command, add the one or more source custom metadata tags to the new metadata entry in the metadata management system.

17. The non-transitory computer readable medium of claim 16, wherein instructions that when executed cause the processor to determine, by the metadata management system, whether the data set in the at least one data storage system matches a destination data set in the destination data storage system after the execution of the backup data operation command comprises instructions that when executed cause the processor to determine whether a name of the data set in the at least one data storage system matches a name of the destination data set.

18. The non-transitory computer readable medium of claim 11, further comprising instructions that when executed cause the processor to:
perform, by the metadata management system, a duplicate data set detection across the plurality of data storage systems to determine if one or more duplicate copies of the data set exist;
in response to determining that one or more duplicate copies of the data set exist, extract, by the metadata management system, at least one custom metadata tag from metadata corresponding to oldest of the one or more duplicate copies; and
add the extracted at least one custom metadata tag to the new metadata entry in the metadata management system.

19. The method of claim 1, wherein the custom metadata tags are not stored with the electronic data in the plurality of data storage systems.

20. The non-transitory computer readable medium of claim 11, wherein instructions causing the processor to analyze the metadata in the respective metadata entry, comprises instructions causing the processor to analyze at least one of the group consisting of: metadata content; metadata characteristics; components of the metadata; format of the metadata; and combinations thereof.

* * * * *